(12) United States Patent
Xu et al.

(10) Patent No.: US 12,418,379 B2
(45) Date of Patent: Sep. 16, 2025

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventors: Wei Xu, Jiangsu (CN); Yuwei Gao, Jiangsu (CN); Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 347 days.

(21) Appl. No.: 18/013,563

(22) PCT Filed: Aug. 10, 2021

(86) PCT No.: PCT/CN2021/111658
§ 371 (c)(1),
(2) Date: Dec. 29, 2022

(87) PCT Pub. No.: WO2022/037433
PCT Pub. Date: Feb. 24, 2022

(65) Prior Publication Data
US 2023/0327831 A1    Oct. 12, 2023

(30) Foreign Application Priority Data

Aug. 17, 2020 (CN) .......................... 202010824989.3

(51) Int. Cl.
*H04W 16/28* (2009.01)
*H04L 5/00* (2006.01)
*H04W 24/10* (2009.01)

(52) U.S. Cl.
CPC ........... *H04L 5/0051* (2013.01); *H04W 16/28* (2013.01); *H04W 24/10* (2013.01)

(58) Field of Classification Search
CPC ...... H04L 5/0051; H04W 16/28; H04W 24/10
See application file for complete search history.

(56) References Cited

U.S. PATENT DOCUMENTS

2010/0316006 A1    12/2010 Thomson
2021/0384637 A1*   12/2021 Sciancalepore ...... H01Q 15/148
(Continued)

FOREIGN PATENT DOCUMENTS

CN    103947145 A    7/2014
CN    104012153 A    8/2014
(Continued)

OTHER PUBLICATIONS

International Search Report and Written Opinion mailed on Oct. 28, 2021, received for PCT Application PCT/CN2021/111658, filed on Aug. 10, 2021, 9 pages including English Translation.
Zheng et al., "Channel Estimation for Ambient Backscatter Communications with Large Intelligent Surface", IEEE Xplore, Dec. 31, 2019, pp. 1-5.
(Continued)

*Primary Examiner* — Fahmida S Chowdhury
(74) *Attorney, Agent, or Firm* — XSENSUS LLP

(57) ABSTRACT

Provided in the present disclosure are an electronic device and method for wireless communication, and a computer readable storage medium. The electronic device comprises: a processing circuit, which is configured to: determine whether a target user equipment (UE) will apply a large intelligent surface (LIS)-assisted communication mode; and, if it is determined that the target UE will apply the LIS-assisted communication mode, send to the target UE configuration information of an LIS reference signal for channel state measurement in the LIS-assisted communication mode.

18 Claims, 20 Drawing Sheets

(56) References Cited

U.S. PATENT DOCUMENTS

| | | | |
|---|---|---|---|
| 2022/0014935 A1* | 1/2022 | Haija | H04L 5/0048 |
| 2022/0393781 A1* | 12/2022 | Kim | G06N 3/08 |
| 2023/0107283 A1* | 4/2023 | Park | H01Q 15/148 |
| | | | 370/329 |
| 2023/0176174 A1* | 6/2023 | Penna | G01S 5/02521 |
| | | | 342/451 |
| 2023/0231653 A1* | 7/2023 | Shin | H03M 13/036 |
| | | | 370/252 |
| 2023/0261906 A1* | 8/2023 | Kim | H04L 25/022 |
| | | | 370/252 |
| 2023/0269024 A1* | 8/2023 | Lee | H04L 1/0003 |
| | | | 714/750 |
| 2023/0275686 A1* | 8/2023 | Shin | H04L 1/0026 |
| | | | 370/329 |
| 2023/0275729 A1* | 8/2023 | Keum | H04L 27/2657 |
| | | | 370/329 |
| 2023/0291476 A1* | 9/2023 | Lee | H04B 10/11 |
| 2023/0299825 A1* | 9/2023 | Noh | H01Q 9/045 |
| 2023/0354228 A1* | 11/2023 | Kim | H04W 56/0015 |

FOREIGN PATENT DOCUMENTS

| | | |
|---|---|---|
| CN | 109818721 A | 5/2019 |
| CN | 110225538 A | 9/2019 |
| CN | 110839204 A | 2/2020 |
| CN | 111093267 A | 5/2020 |
| WO | WO-2019042223 A1 | 3/2019 |
| WO | WO-2019096138 A1 | 5/2019 |

OTHER PUBLICATIONS

Ericsson, St-Ericsson, "On Macro-Femto interference handling" 3GPP TSG-RAN WG1 #63, R1-106387, Jacsonville, USA, Nov. 15-19, 2010, pp. 1-5.

* cited by examiner

ELECTRONIC DEVICE AND METHOD FOR WIRELESS COMMUNICATION, AND COMPUTER READABLE STORAGE MEDIUM

CROSS-REFERENCE TO RELATED APPLICATIONS

The present application is based on PCT filing PCT/CN2021/111658, filed Aug. 10, 2021, which claims priority to Chinese Patent Application No. 202010824989.3, titled "ELECTRONIC DEVICE AND METHOD FOR WIRELESS COMMUNICATION AND COMPUTER-READABLE STORAGE MEDIUM", filed on Aug. 17, 2020 with the China National Intellectual Property Administration, the entire contents of which are incorporated herein by reference in their entirety.

TECHNICAL FIELD

The present disclosure relates to the field of wireless communication technology, in particular to the determination of a large intelligent surface (LIS)-assisted wireless communication mode. More particularly, the present disclosure relates to an electronic apparatus and a method for wireless communications, and a computer-readable storage medium.

BACKGROUND

One of the main challenges of the next generation wireless network is to meet the growing demand for higher data rates. Meanwhile, another concern is the energy efficiency issues caused by the significant increase in the number of cellular connectivity devices. LIS has become a promising cost-effective technology to improve the spectrum and energy efficiency of a future wireless network. The LIS is a hyper surface composed of many small passive reflectors, and can modify an incident signal and guide a reflected wave to move in any predetermined direction, so as to obtain an ideal electromagnetic propagation environment with limited power consumption. For example, under the control of a base station, the LIS modifies a phase of an incident wave to obtain a reflected wave in an appropriate reflection direction to improve the signal quality of a receiver.

FIG. 1 is a schematic diagram showing an LIS-based assisted communication mode. Due to the existence of an obstacle or other reasons, the communication quality of a direct link from gNB to user equipment (UE) served by gNB is poor. In this case, the transmission mode of the UE may be changed to use the LIS to assist communication. As shown in FIG. 1, a signal for a user is reflected by the LIS and then provided to the user in a certain reflection direction.

However, after the introduction of the LIS into a cellular communication system, the switching of the user transmission mode not only affects the link quality of the user itself, but also changes the channel quality of other users due to the passive reflection property of the LIS. Therefore, it is desirable to provide a communication mechanism in which the transmission modes of multiple users are considered cooperatively.

SUMMARY OF THE INVENTION

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: determine whether target user equipment is to apply an LIS-assisted communication mode; and in a case of determining the target user equipment is to apply the LIS-assisted communication mode, transmit, to the target user equipment, configuration information of an LIS reference signal to be used for channel status measurement under the LIS-assisted communication mode.

According to another aspect of the present disclosure, a method for wireless communications is provided. The method includes: determining whether target user equipment is to apply an LIS-assisted communication mode; and in a case of determining the target user equipment is to apply the LIS-assisted communication mode, transmitting, to the target user equipment, configuration information of an LIS reference signal to be used for channel status measurement under the LIS-assisted communication mode.

According to an aspect of the present disclosure, an electronic apparatus for wireless communications is provided. The electronic apparatus includes processing circuitry. The processing circuitry is configured to: acquire, from a base station, configuration information of an LIS reference signal to be used for channel status measurement under an LIS-assisted communication mode; and perform measurement of the LIS reference signal based on the configuration information.

According to another aspect of the present disclosure, a method for wireless communications is provided. The method includes: acquiring, from a base station, configuration information of an LIS reference signal to be used for channel status measurement under an LIS-assisted communication mode; and performing measurement of the LIS reference signal based on the configuration information.

According to other aspects of the present disclosure, there are further provided computer program codes and computer program products for implementing the methods for wireless communications above, and a computer-readable storage medium having recorded thereon the computer program codes for implementing the methods for wireless communications described above.

With the electronic apparatus and method according to the embodiment of the present disclosure, a specific LIS reference signal is configured for the base station and UE under the LIS-assisted communication mode, so as to achieve accurate channel measurement under the LIS-assisted communication mode to avoid or alleviate the interferences between UEs.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF THE EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
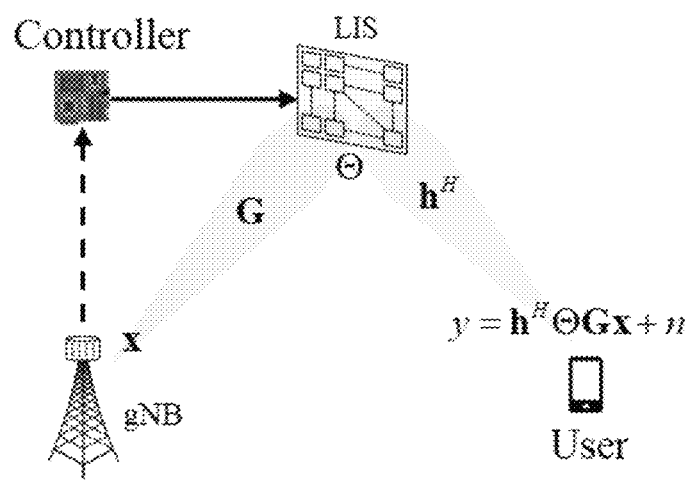
FIG. 1 is a schematic diagram showing an LIS-based assisted communication mode.
Figure 2:
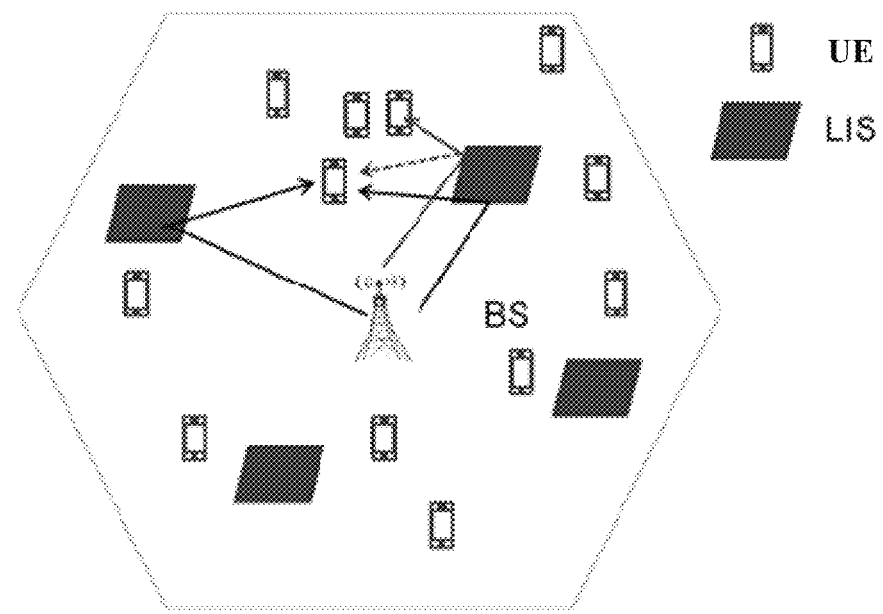
FIG. 2 shows a schematic example of an application scenario of an LIS.
Figure 3:
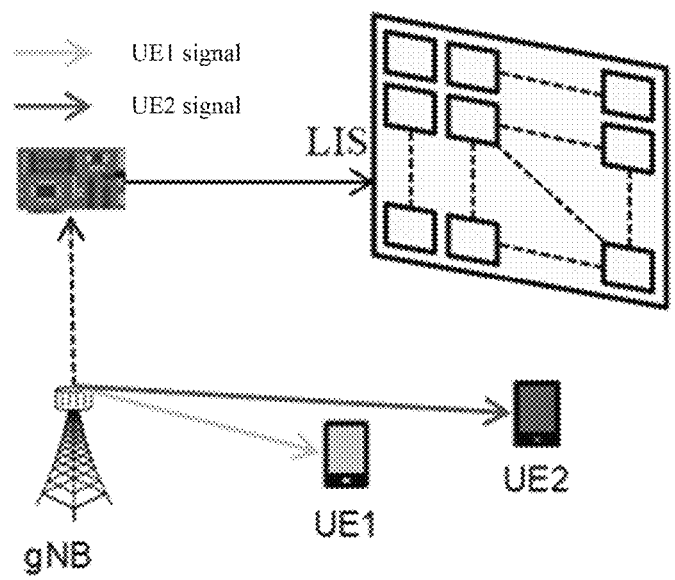
FIG. 3 shows a possible communication mode in a case of considering two UEs and one LIS.
Figure 4:
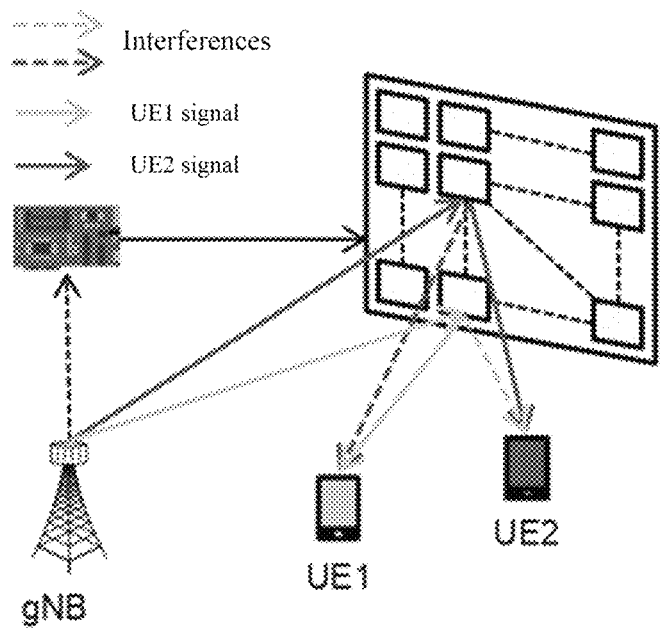
FIG. 4 shows another possible communication mode in a case of considering two UEs and one LIS.
Figure 5:
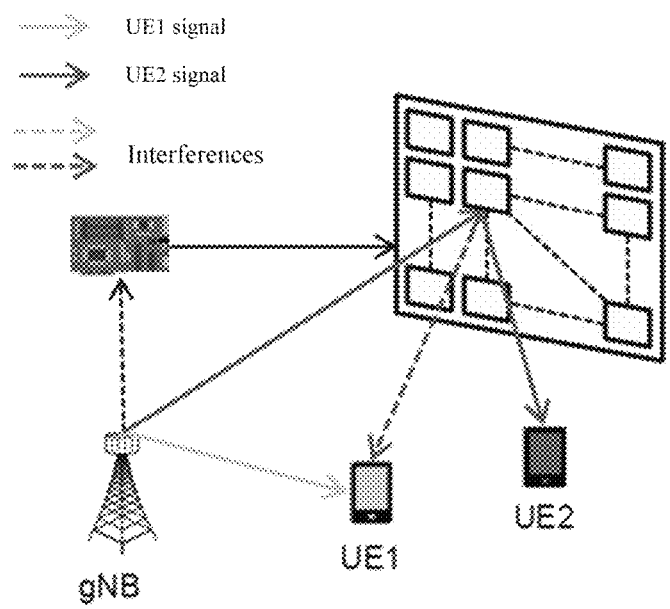
FIG. 5 shows another possible communication mode in a case of considering two UEs and one LIS.

FIG. 2 shows a schematic example of an application scenario of LIS. Multiple LISs are deployed in a cell, each LIS may serve one or more UEs, and each UE may also be served by one or more LISs. For example, in a case of considering two UEs and one LIS, there may be three modes: 1) gNB directly serves the two UEs without the assistance of the LIS, as shown in FIG. 3; 2) the two UEs communicate with the assistance of the LIS, as shown in FIG. 4; 3) Only UE2 communicates with the assistance of the LIS, as shown in FIG. 5. It can be seen that in FIGS. 4 and 5, the LIS-assisted communication for one UE will produces interferences on the other UEs due to the passive reflection property of the LIS. In a case of considering multiple LISs, the interferences condition is more complex.

Therefore, it is necessary to consider a cooperative relationship among multiple LISs and multiple users. Therefore, it is desirable to provide a technology for dynamically selecting and switching the transmission modes of UE. In order to select an appropriate association mode between the LIS and the user and an appropriate reflecting beam direction of each LIS, it is necessary to accurately estimate channel status information of a channel among a base station, LIS and UE. With respect to, but not limited to, this purpose, an electronic apparatus 100 for wireless communications is provided according to this embodiment.

Figure 6:
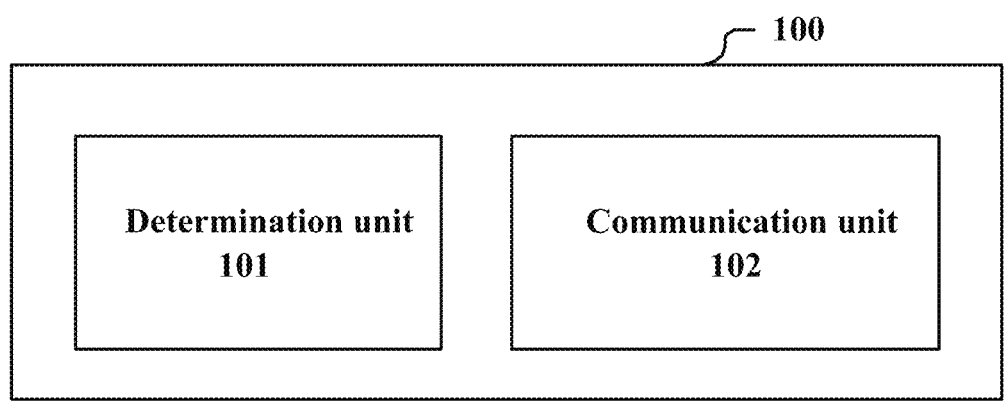
FIG. 6 is a block diagram showing functional modules of an electronic apparatus for wireless communications according to an embodiment of the present disclosure.

FIG. 6 is a block diagram showing functional modules of an electronic apparatus 100 according to an embodiment of the present disclosure. The electronic apparatus 100 includes a determination unit 101 and a communication unit 102. The determination unit 101 is configured to determine whether a target UE is to apply an LIS-assisted communication mode. The communication unit 102 is configured to: in a case that the determination unit 101 determines the target UE is to apply the LIS-assisted communication mode, transmit, to the target UE, configuration information of an LIS reference signal to be used for channel status measurement under the LIS-assisted communication mode.

The determination unit 101 and the communication unit 102 may be implemented by one or more processing circuits. The processing circuits may be implemented as a chip and a processor, for example. Furthermore, it should be understood that functional units of the electronic apparatus shown in FIG. 6 are only logic modules divided according to the implemented specific functions, and are not intended to limit the specific implementations.

The electronic apparatus 100 may be arranged on a base station side or communicatively connected to the base station, for example. The base station described herein may also be a Transmission Receive Point (TRP) or an Access Point (AP). Here, it should also be noted that the electronic apparatus 100 may be implemented in a chip level, or in an apparatus level. For example, the electronic apparatus 100 may function as the base station itself, and may also include an external device such as a memory, a transceiver (not shown). The memory may be used to store programs required by the base station to achieve various functions and related data information. The transceiver may include one or more communication interfaces to support communication with different devices (e.g., UE, other base stations or the like). Implementations of the transceiver are not limited here.

Since the LIS is a passive array, and does not emit a new signal by itself, in the LIS-assisted communication mode, the base station is required to assist the LIS in beam scanning for channel status measurement. An LIS reference signal is provided according to this embodiment to assist the LIS in beam scanning. With this LIS reference signal, UE may measure channel status information of a channel corresponding to a base station-LIS-UE for each beam from each LIS, and select an appropriate beam, namely the LIS and a reflection direction corresponding to the beam, for communication based on the measured channel status information.

The target UE described here is the UE that may apply the LIS-assisted communication mode. For example, the determination unit 101 is configured to determine that the target UE is to apply the LIS-assisted communication mode in a case that communication quality of the target UE is lower than a predetermined threshold. The communication quality of the target UE may be measured by a quality of service (QOS) index such as reference signal reception power (RSRP), reference signal reception quality (RSRQ), signal to interference and noise ratio (SINR).

For example, the communication unit 102 may acquire, from the target UE, communication quality information, such as a Channel Quality Indicator (CQI), of the target UE, or the determination unit 101 may estimate the communication quality of the target UE.

In addition, the determination unit 101 may determine that the target UE is to apply the LIS-assisted communication mode in response to an LIS assisting request from the target UE. In this case, for example, when detecting that the communication quality of the target UE is lower than a predetermined threshold, the target UE transmits the LIS assisting request to the base station to request to switch to the LIS-assisted communication mode.

When determining whether the target UE is to apply the LIS-assisted communication mode, the determination unit 101 may also take into account a priority level of the target UE. For example, when the priority level of the target UE is high, the possibility of applying the LIS-assisted communication mode is increased. The priority level information of the target UE may be acquired by the communication unit 102 from the target UE, or pre-stored on the base station side.

The communication unit 102, in response to the determination unit 101 determining that the target UE is to apply the LIS-assisted communication mode, transmits, to the target UE, configuration information of an LIS reference signal to be used for channel status measurement under the LIS-assisted communication mode.

In an example, a mode of the LIS reference signal of each LIS may be predetermined. The communication unit 102 provides the UE with the predetermined configuration information of the LIS reference signal of each LIS.

In another example, the configuration information of the LIS reference signal to be provided to the UE may be dynamically determined. For example, the determination unit 101 may also be configured to determine, in the case of determining the target UE is to apply the LIS-assisted communication mode, an LIS set to be used for LIS-assisted communication for the target UE and an available serving UE set for each LIS in the LIS set. For example, the LIS set includes respective LISs within whose coverage range the target UE is located, and the available serving UE set of an LIS includes UEs within a coverage range of the LIS.

Figure 7:
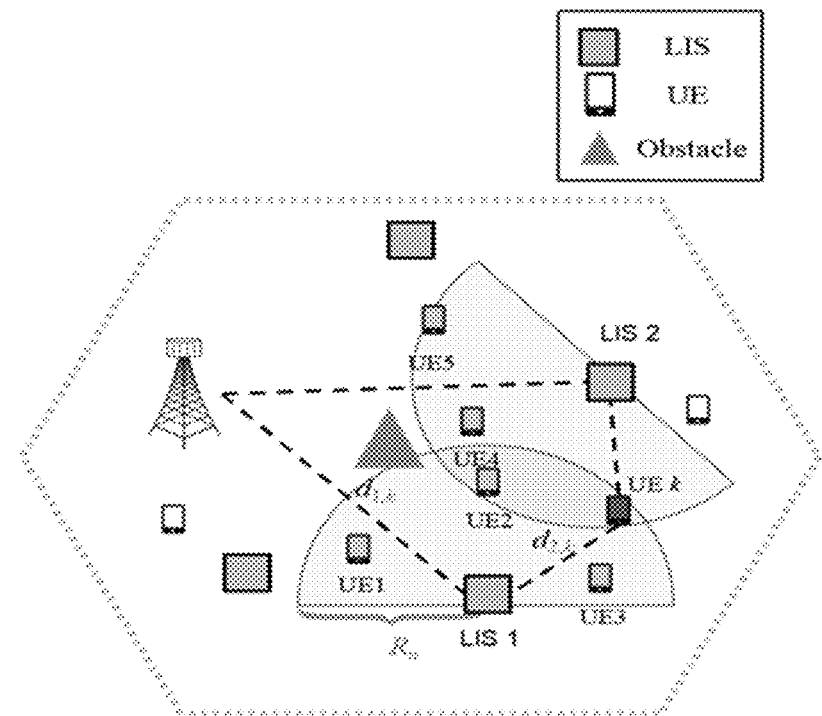
FIG. 7 shows an example of an LIS set and available serving UE set.

For ease of understanding, FIG. 7 shows an example of an LIS set and an available serving UE set. In the example of FIG. 7, two LISs ($LIS_1$ and $LIS_2$) and several UEs are shown. UE k is the target UE, and a coverage range of the LIS is represented by a semicircle (a radius is Rn). It can be seen that the UE k is within the coverage range of $LIS_1$ and $LIS_2$, and thus the LIS set for the UE k is $L_k = \{LIS_1, LIS_2\}$. The servable UE set (i.e., the available serving UE set) within the coverage range of $LIS_1$ is $S_1 = \{UE\ 1, UE\ 2, UE\ 3, UE\ k\}$. Similarly, the available serving UE set for $LIS_2$ is $S_2 = \{UE\ 4, UE\ 5, UE\ k\}$. Therefore, the final available serving UE set is a union of $S_1$ and $S_2$, that is, $S^k = S_1 \cup S_2 = \{UE\ 1, UE\ 2, UE\ 3, UE\ 4, UE\ 5, UE\ k\}$.

In order to determine the LIS set and the available serving UE set, the communication unit 102 may also be configured to acquire, from the target UE, an identifier of the LIS within whose coverage range the target UE is located. On the other hand, since a position of the LIS is fixed, a position of the LIS may be pre-stored on the base station side, and the determination unit 101 may determine the LIS set and the available serving UE set based on pre-stored location information of the LIS and location information of each UE.

The communication unit 102 is configured to transmit, to each of UE in the available UE set, configuration information of the LIS reference signal related to the LIS in the LIS set. The communication unit 102 may transmit the configuration information to the UE via radio resource control (RRC) signaling. This configuration information is used to tell the UE how to receive and parse the LIS reference signal, how to report a measurement result, etc., for example.

The communication unit 102 transmits the LIS reference signal to each UE via a corresponding LIS according to the configuration information of the LIS reference signal, and acquires a measurement result reported by each UE for measuring the LIS reference signal.

For example, the communication unit 102 may periodically transmit the LIS reference signal and periodically acquire the measurement result of the LIS reference signal.

In addition, in a case that the configuration information indicates an aperiodic reporting of the measurement result, the communication unit 102 is also configured to transmit a trigger signaling for reporting the measurement result of the LIS reference signal to each UE, and acquire an aperiodic measurement result of the LIS reference signal.

For example, the configuration information of the LIS reference signal may include one or more of the following: a time-frequency resource location where the LIS reference signal is located, a correspondence relationship between LIS reference signals on different time-frequency resource locations and LISs, periodical reporting or non-periodical reporting of a measurement result.

With this configuration information, the UE may know on which time-frequency resources the LIS reference signal is received, which LIS the received LIS reference signal comes from, and further which reflecting beam direction of the LIS the received LIS reference signal comes from, and whether to perform periodical reporting or non-periodical reporting of a measurement result.

In other words, the correspondence relationship between LIS reference signals on different time-frequency resource locations and LISs may also include a correspondence relationship between LIS reference signals on different time-frequency resource locations and reflecting beam directions of different LISs in more detail.

Figure 8:
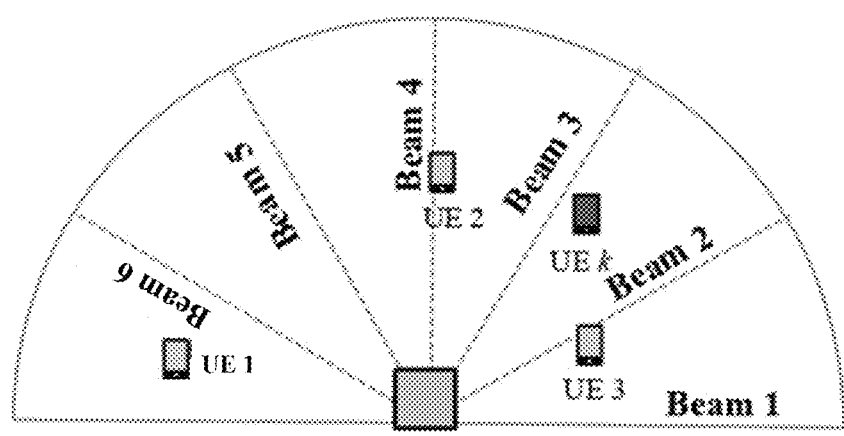
FIG. 8 shows an example of a reflected beam direction of the LIS.

FIG. 8 shows an example of a reflecting beam direction of LIS. A semicircular reflection range of an LIS is divided equally into 6 sectors. Each sector represents a reflecting beam direction, and may be marked with an ID (beam 1, beam 2 . . . beam 6 are marked in FIG. 8).

For example, the LIS reference signal may be configured as follows: LIS reference signals for different LISs are distinguished in frequency domain, and LIS reference signals for different reflecting beam directions of the same LIS are distinguished in time domain. That is, LIS reference signals for different LISs occupy different frequency domain resources, and LIS reference signals for different reflecting beam directions of the same LIS occupy different time domain parts of the frequency domain resources of the LIS.

For example, the reference signals for different LISs are distributed on different subcarriers of orthogonal frequency division multiplexing (OFDM) symbols, and the LIS reference signals for different reflecting beam directions of the same LIS are distributed on different resource elements (RE) of the same subcarrier of the OFDM.

In an example, the LIS reference signal is non-precoded/non-beamformed reference signal, and the LIS reference signals for different LISs do not overlap in time domain. In this case, since the LIS reference signal is non-directional and may be reflected by multiple LISs at the same time, the LIS reference signals for different LISs should be assigned with different durations, so that the UE may distinguish the LIS reference signals from different LISs.

Figure 9:
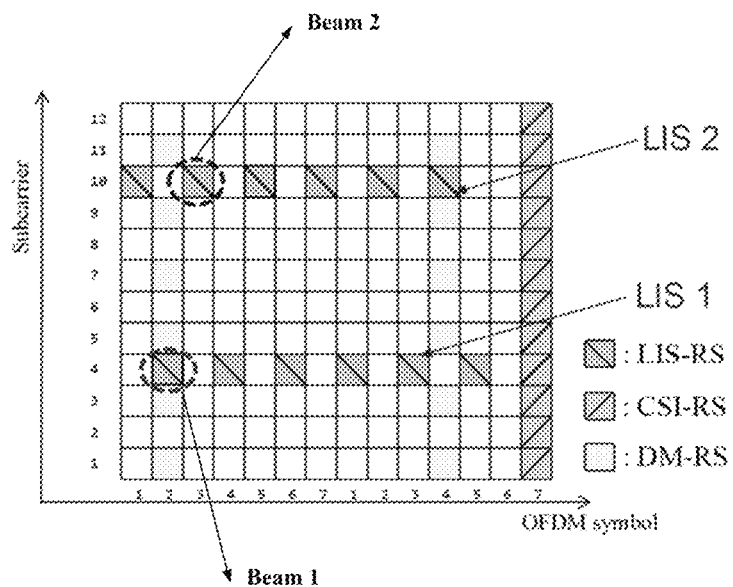
FIG. 9 shows an example of LIS reference signals configured for two LISs respectively, in a case that the LIS reference signals are non-precoded/non-beamformed reference signals.

FIG. 9 shows an example of LIS reference signals configured for two LISs respectively in a case that the LIS reference signal is non-precoded/non-beamformed reference signal. The 4th row of a subcarrier is allocated to LIS 1, and the 10th row is allocated to LIS 2. That is, the LIS reference signals for different LISs are distributed on different subcarriers of OFDM symbols, and RE occupied by the LIS reference signal in 4th row and RE occupied by the LIS reference signal in 10th row are interlaced in time domain. Different columns in each row are assigned to different reflecting beam directions of the corresponding LISs. Suppose an LIS has a reflecting beam direction distribution shown in FIG. 8, for example, the 2th column in the 4th row is assigned to a beam 1 of LIS 1, the 3th column in the 10th row is assigned to a beam 2 of LIS 2, and so on.

Figure 10:
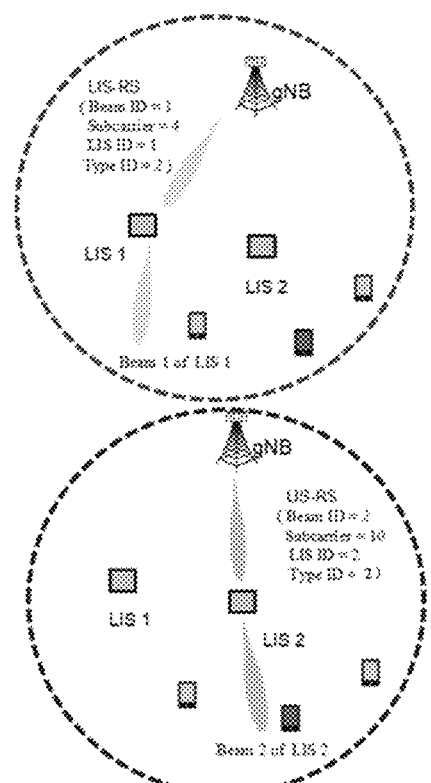
FIG. 10 shows a transmission example of the LIS reference signals of FIG. 9.
Figure 11:
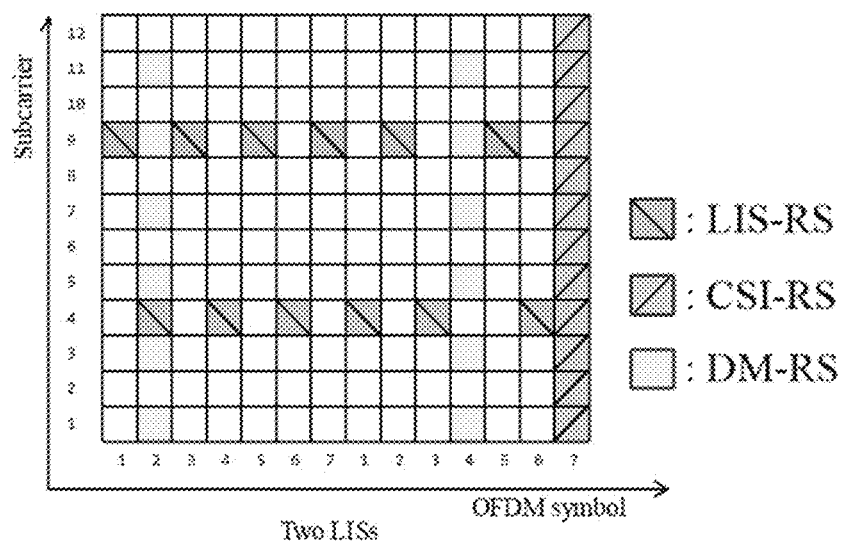
FIG. 11 to FIG. 16 show other configuration examples of LIS reference signals of multiple LISs, in a case that the LIS reference signals are non-precoded/non-beamformed reference signals.
Figure 12:
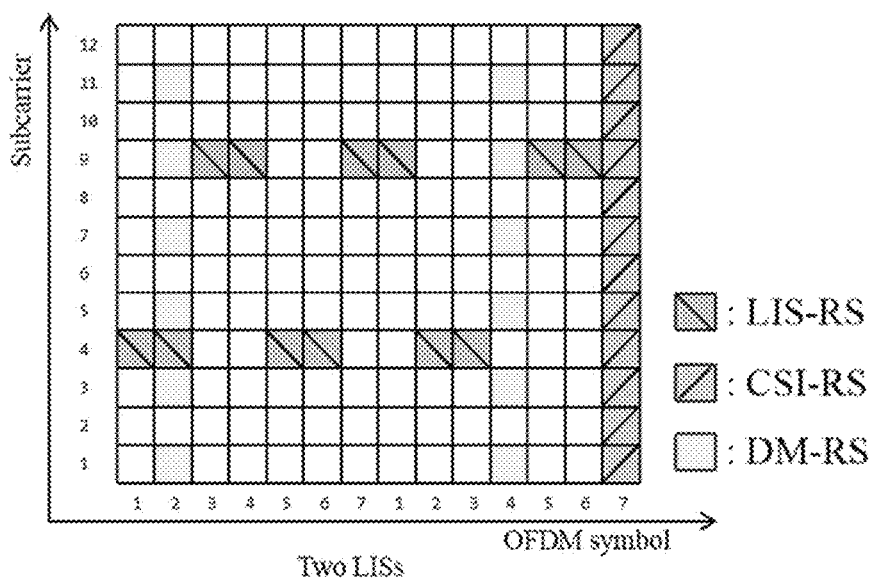

FIG. 10 shows a transmission example of the LIS reference signal of FIG. 9. The LIS reference signal is first transmitted from a base station to a corresponding LIS, and then the LIS transmits a reflecting beam with a reflecting beam direction corresponding to the LIS reference signal to the UE. In the upper part of FIG. 10, the transmission of LIS reference signal (LIS-RS) for LIS 1 is shown, where LIS ID=1 represents LIS 1, Beam ID=1 represents Beam 1, Subcarrier=4 represents that the LIS-RS is allocated with a subcarrier of the 4th row, and Type ID=2 represents that the reference signal is non-precoded/non-beamformed. In the lower part of FIG. 10, the transmission of the LIS reference signal (LIS-RS) for LIS 2 is shown. Similarly, LIS ID=2 represents LIS 2, Beam ID=2 represents Beam 2, and Subcarrier=10 represents that the LIS-RS is assigned with a subcarrier of the 10th row. As shown in FIG. 10, the transmission of LIS reference signals for LIS 1 and that for LIS 2 are separated in time.

Figure 13:
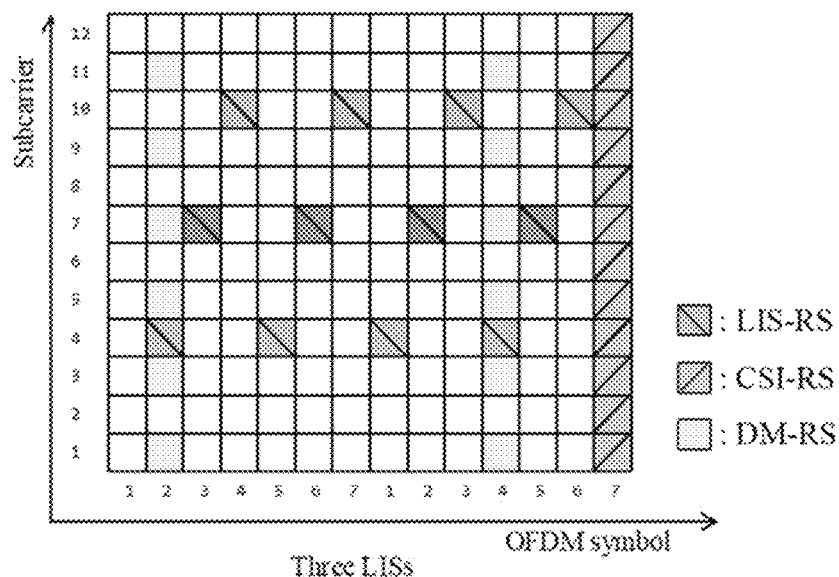
Figure 14:
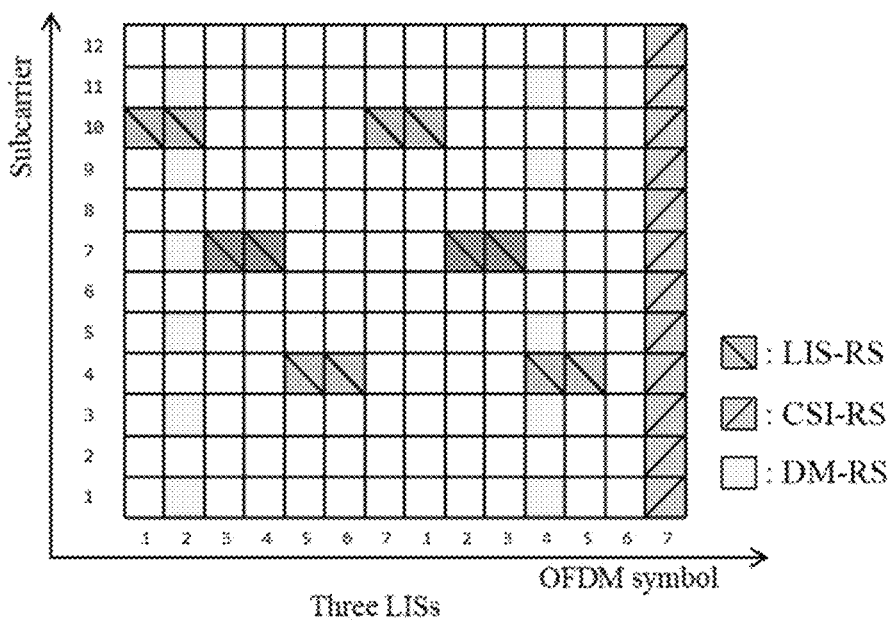
Figure 15:
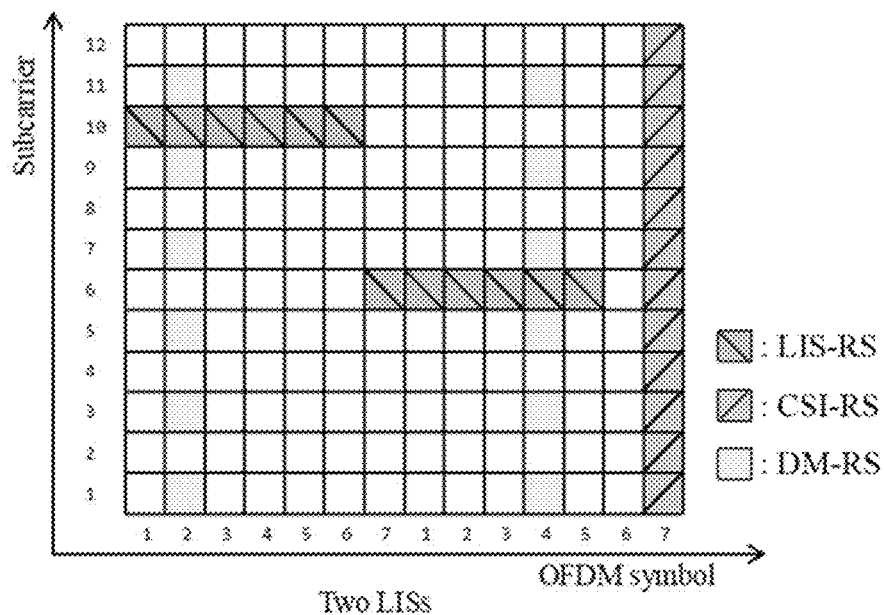
Figure 16:
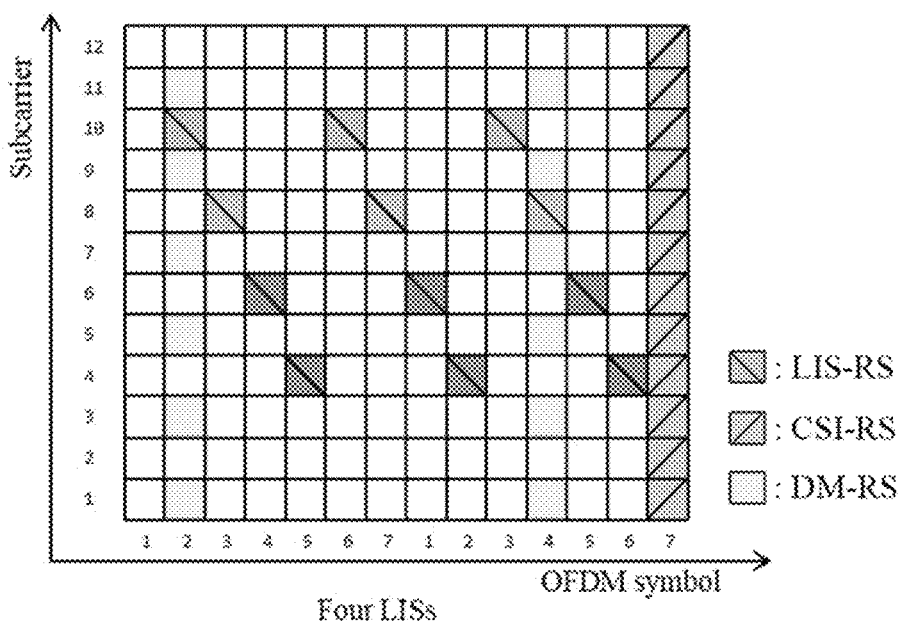

It should be understood that FIG. 9 is only a configuration example, rather than limitation, and any configuration mode, as long as it meets the above principles, is feasible. For ease of understanding, FIGS. 11 to 16 show another configuration examples of LIS reference signals of multiple LISs, in a case that the LIS reference signal is non-precoded/non-beamformed reference signal. In the examples of FIGS. 13, 14 and 16, each row represents less than 6 reflecting beam directions of a reference signal block, that is, it is impossible to scan all reflecting beam directions of an LIS at one time. In this case, two reference signal blocks may be transmitted consecutively to represent different reflecting beam directions in different time slots, so as to complete scanning of all reflecting beam directions.

In another example, the LIS reference signal is a precoded/beamformed reference signal, and the LIS reference signals for different LISs overlap in the time domain. Because the LIS reference signal is digitally precoded, each OFDM symbol may have different subcarriers. The base station may transmit a corresponding LIS reference signal directionally according to a position of each LIS. The UE may distinguish LIS reference signals from different LISs according to the subcarriers. In other words, in this case, the LIS reference signals for different LISs may overlap in the time domain, thus having higher configuration flexibility.

Figure 17:
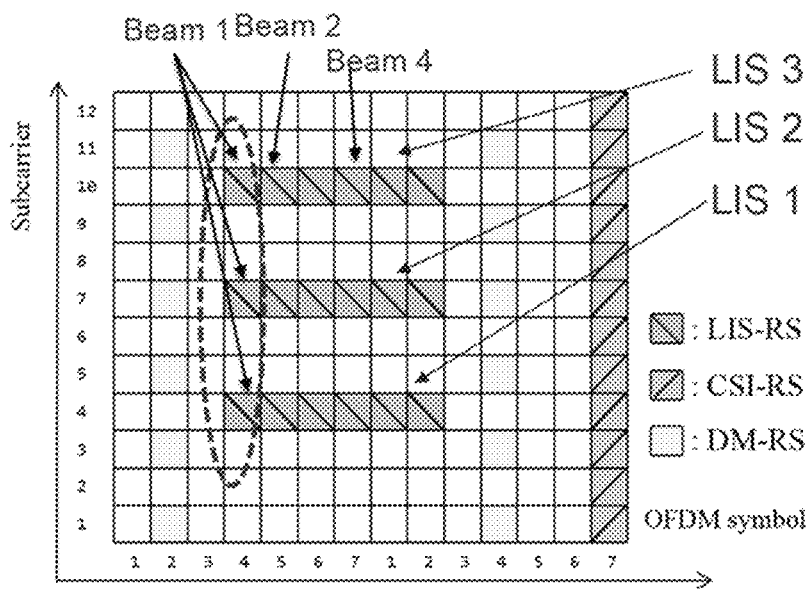
FIG. 17 shows an example of LIS reference signals configured for three LISs respectively, in a case that the LIS reference signals are precoded/beamformed reference signals.

FIG. 17 shows an example of LIS reference signals configured for three LISs respectively in a case that the LIS reference signal is a precoded/beamformed reference signal. The 4th row of a subcarrier is allocated to LIS 1, the 7th row is allocated to LIS 2, and the 10th row is allocated to LIS 3. That is, the LIS reference signals for different LISs are distributed on different subcarriers of OFDM symbols, and RE occupied in each row overlaps in time domain. Different columns in each row are assigned to different reflecting beam directions of a corresponding LIS. Suppose LIS has the reflecting beam direction distribution shown in FIG. 8, for example, the 4th column in the 4th, 7th and 10th rows is assigned to beam 1 of LIS 1, beam 1 of LIS 2 and beam 1 of LIS 3 respectively, and so on.

Figure 18:
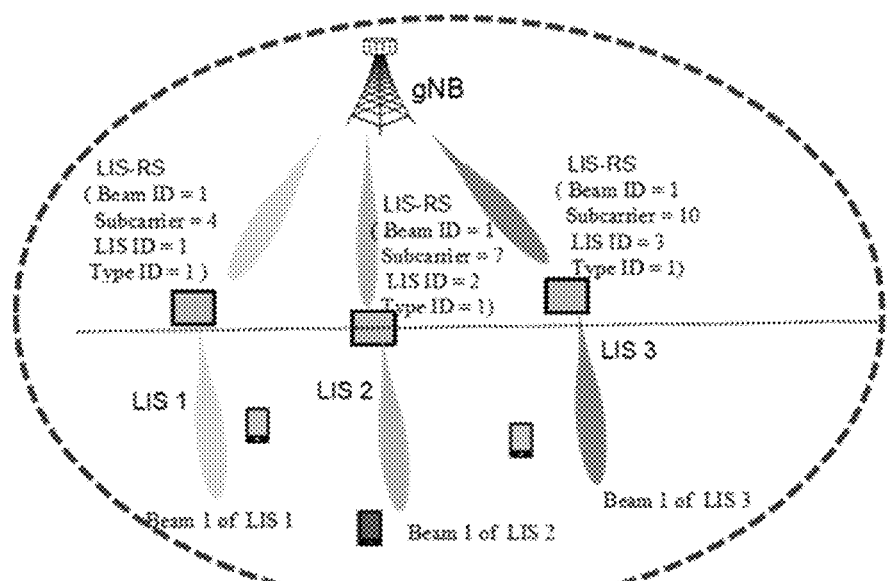
FIG. 18 shows a transmission example of the LIS reference signals of FIG. 17.
Figure 19:
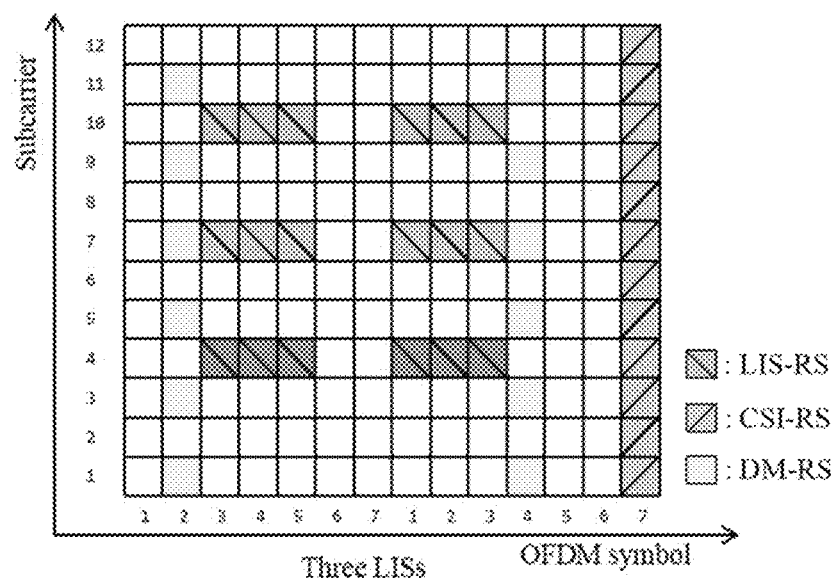
FIG. 19 to FIG. 23 show other configuration example of LIS reference signals of multiple LISs, in a case that the LIS reference signals are precoded/beamformed reference signals.
Figure 20:
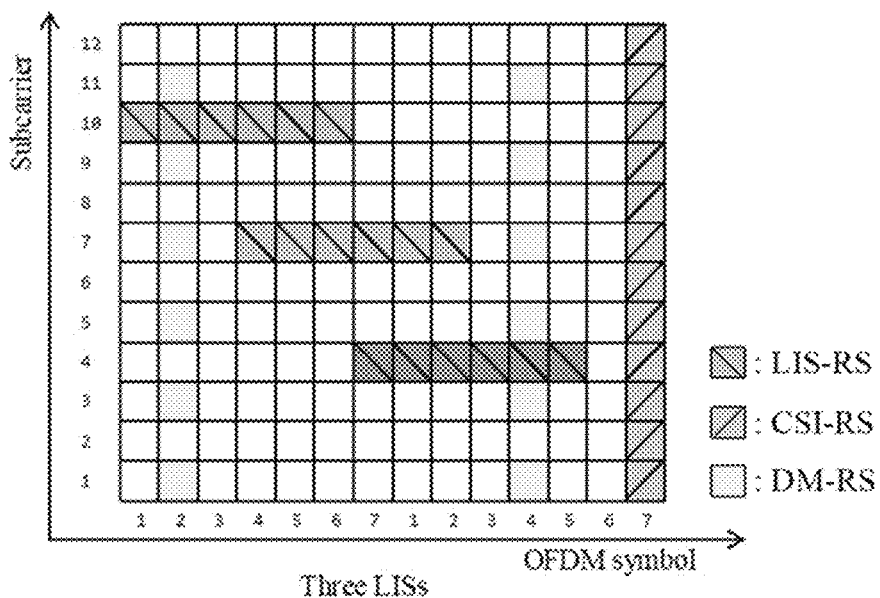
Figure 21:
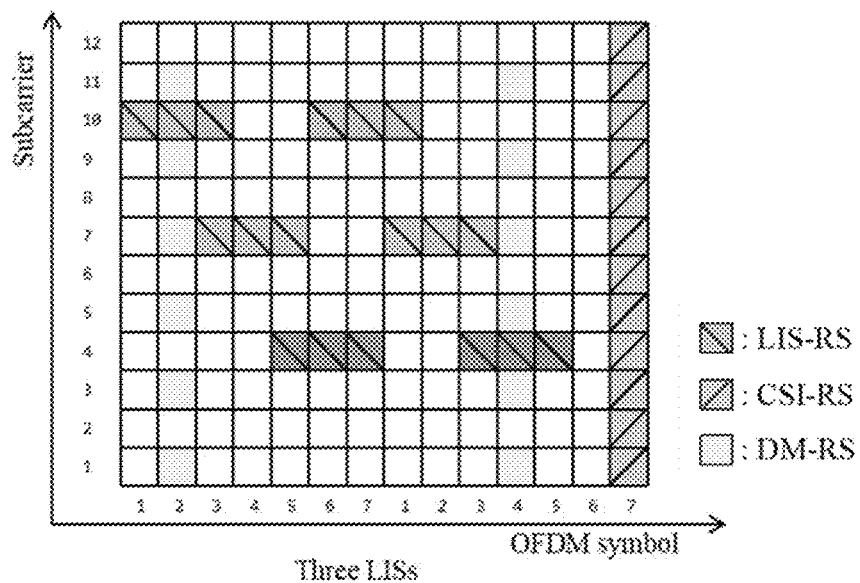
Figure 22:
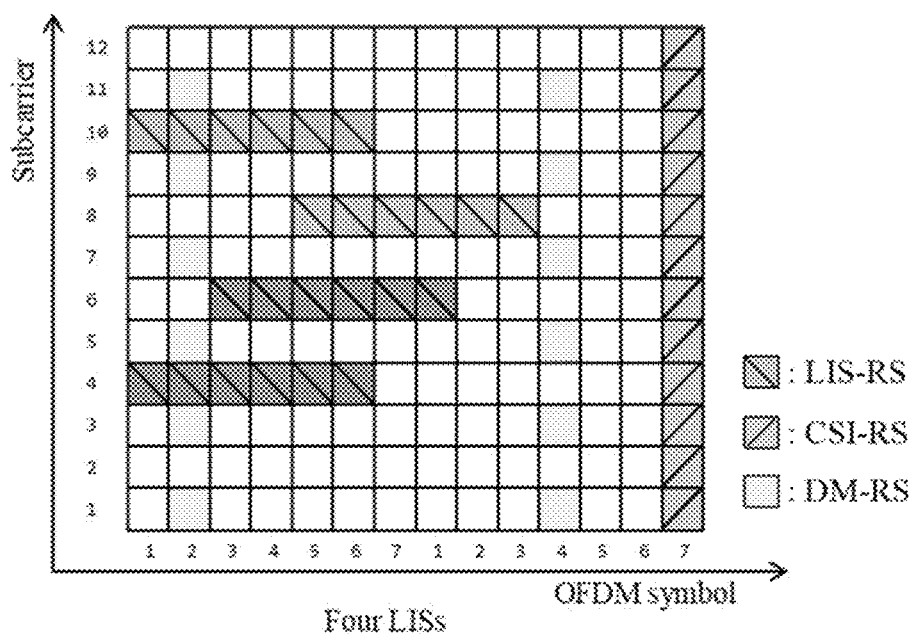
Figure 23:
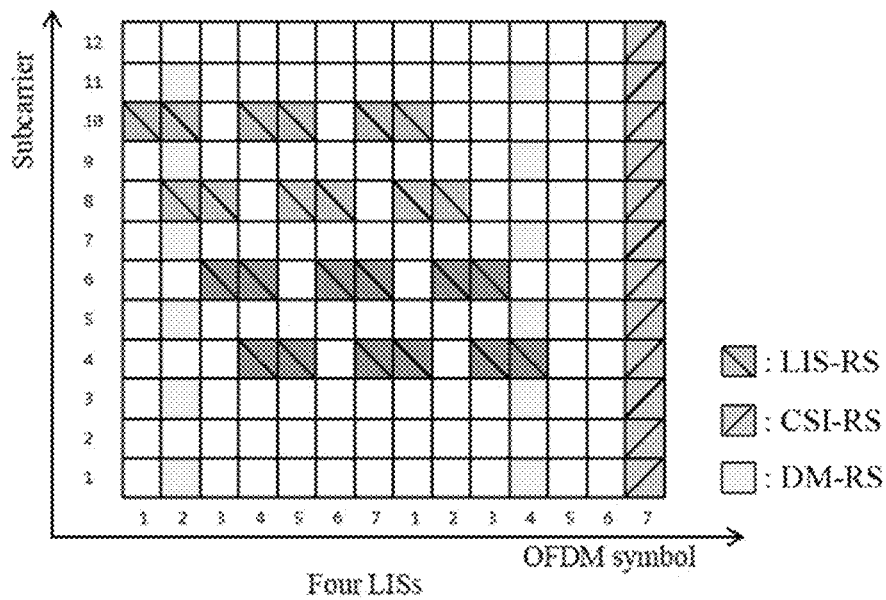

FIG. 18 shows a transmission example of the LIS reference signals in FIG. 17. Similarly, the LIS reference signal is first transmitted from a base station to a corresponding LIS, and then the LIS transmits the reflecting beam with the reflecting beam direction corresponding to the LIS reference signal to the UE. As shown in FIG. 18, the base station simultaneously transmits LIS reference signals for LIS 1, LIS 2 and LIS 3 on different subcarriers (subcarriers 4, 7 and 10), and the reflecting beam direction of the LIS 1, LIS 2 and LIS 3 each is beam 1. Type ID=1 represents that the reference signal is precoded/beamformed.

It should be understood that FIG. 17 is only a configuration example, rather than limitation, any configuration mode, as long as it meets the above principles, is feasible. For ease of understanding, FIGS. 19 to 23 show another configuration example of LIS reference signals of multiple LISs in a case that the LIS reference signal is a precoded/beamformed reference signal. In the examples of FIG. 20 to FIG. 23, the LIS reference signals of the multiple LISs partially overlap in the time domain.

As described above, the communication unit 102 transmits the LIS reference signal according to the configuration information of the LIS reference signal, and meanwhile, the base station sequentially controls the reflecting beam direction of each LIS to obtain the desired reflecting beam for downlink beam scanning of the base station-LIS-UE. The UE sequentially measures received signal strength of a corresponding LIS reference signal, and feeds a measurement result back to the base station. The base station selects an appropriate channel for the UE based on the measurement result to perform LIS-assisted communication.

As an example, the communication unit 102 may be configured to acquire, from the UE, with respect to each LIS in the LIS set, information of a reflecting beam direction in which the target UE receives signal of the maximum strength from the LIS.

Specifically, the target UE measures the LIS reference signal in each reflecting beam direction of each LIS, and $P_{n, k, i}$ is used to represent a signal strength in the i-th reflecting beam direction of LIS n that the target UE k receives. Thus, the reflecting beam direction in which the target UE receives signal of the maximum strength from the LIS n $i_{n,k,opt}$ (i.e., an optimal reflecting beam direction) is determined by the following equation.

$$i_{n,k,opt} = \arg \max_{i=1,2,\cdots} \frac{P_{n,k,i}}{\sum_{k'=k} P_{n,k',i} + P_N} \quad (1)$$

where $P_N$ is the noise power, n is an ID of LIS in the LIS set $L_k$, k is an ID of the target UE, and i is an ID of the reflecting beam.

In addition, the communication unit 102 is also configured to acquire, from each UE among at least a part of remaining UEs in the available serving UE set other than the target UE, with respect to each LIS in the LIS set, information of a reflecting beam direction in which the UE receives signal of a strength meeting a communication quality requirement.

The remaining UE k' (k'≠k) in the available serving UE set $S^k$ may determine a set of the reflecting beam directions in which the communication quality requirement of the remaining UE k' is met by the following equation.

$$i_{n,k'} = \left\{ k' \middle| \frac{P_{n,k',i}}{\sum_{m \neq k'} P_{n,1} + P_N} > SINR_{min,k'} \right\} \quad (2)$$

$i_{n,k'}$ represents a set of reflecting beam directions of LIS n in which the communication quality requirement of the UE k' is met, $P_{n,k',i}$ represents a signal strength for the UE k' in the i-th reflecting beam direction of LIS n that the UE k' receives, $P_{n,m,i}$ represents a signal strength for the remaining UE other than the UE k' in the i-th reflecting beam direction of LIS n that the UE k' receives, and $SINR_{min,k'}$ represents a minimum value of SINR required to meet the communication quality requirement of the UE k'.

If none of reflecting beams of an LIS can meet the communication quality requirement of the UE k', the UE k' may not report for the LIS. If none of reflecting beams of all of the LISs can meet the communication quality requirement of the UE k', the UE k' may continue to maintain direct communication with the base station without reporting the measurement result.

For example, the measurement result reported by the UE may include an identifier (ID) of the LIS and an ID of the reflecting beam direction. For the target UE, the measurement result represents an optimal reflecting beam direction of the LIS in the LIS set. For the remaining UE, the measurement result represents an LIS and a reflecting beam direction of the LIS that meet the communication quality requirement of the remaining UE.

Alternatively, the measurement result reported by the UE may include a time-frequency resource location of the LIS reference signal. Since the time-frequency resource location of the LIS reference signal corresponds to the reflecting beam direction of the LIS, the determination unit 101 may determine a corresponding LIS and reflecting beam direction based on the time-frequency resource location.

After the communication unit 102 acquires the above information, the determination unit 101 is configured to determine a specific LIS-assisted communication mode based on the measurement result, for example, to determine one or more LISs to be used in the LIS-assisted communication for the target UE and the reflecting beam direction of each LIS. The determination unit 101 is further configured to determine an associated user set of the target UE based on the measurement result. The determined one or more LISs also serve the UE in the associated user set. In this way, multiple LISs-based LIS-assisted cooperative transmission among multiple UEs may be realized to avoid interferences among UEs.

For example, the determination unit 101 may be configured to take the reflecting beam direction of each LIS reported by the target UE as the reflecting beam direction of the LIS to be used in the LIS-assisted communication, and take the UE that receives signal of strength meeting the communication quality requirement in the reflecting beam direction of the LIS as the UE in the associated user set of the target UE, where the LIS also serves the UE in the associated user set.

Figure 24:
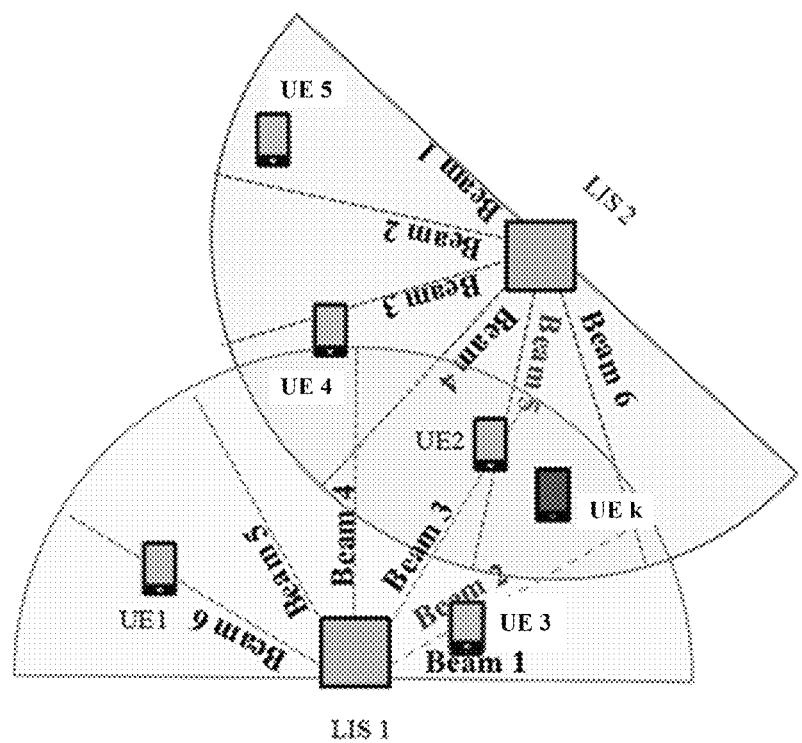
FIG. 24 shows a schematic diagram of a scenario of LIS 1 and LIS 2 as well as UEs within a coverage range thereof.

An example in which the determination unit 101 determines a specific LIS-assisted communication mode is given below with reference to FIG. 24. FIG. 24 is a schematic diagram showing a scenario for LIS 1 and LIS 2 and UEs within a coverage range of the LISs. UE k is a target UE, an available LIS set includes LIS 1 and LIS 2, and an available serving UE set includes UE1-UE5 and UE k. After providing reference signal configuration information of the LIS 1 and LIS 2 to the UE, the base station transmits the LIS reference signal to the UE through a corresponding LIS. The UE measures LIS reference signal in each reflecting beam direction of each LIS and reports a measurement result in the above manner. UE 4 and UE 5 do not detect the reflecting beam meeting the communication quality requirement of the UE 4 and UE 5, so they do not report a measurement result.

The measurement result reported by the target UE k and the remaining UEs 1-3 are shown in a table below. Table 1 shows the measurement result of these UEs for each reflecting beam direction of LIS 1. Table 2 shows the measurement result of these UEs for each reflecting beam direction of LIS 2.

TABLE 1

| LIS 1 | beam 1 | beam 2 | beam 3 | beam 4 | beam 5 | beam 6 |
|---|---|---|---|---|---|---|
| UE 1 |  |  |  |  | √ | √ |
| UE 2 |  | √ | √ | √ |  |  |
| UE 3 | √ | √ |  |  |  |  |
| UE k |  | √ |  |  |  |  |

TABLE 2

| LIS 2 | beam 1 | beam 2 | beam 3 | beam 4 | beam 5 | beam 6 |
|---|---|---|---|---|---|---|
| UE 1 |  |  | √ | √ | √ |  |
| UE 2 |  | √ | √ | √ |  |  |
| UE 3 | √ | √ |  |  |  |  |
| UE k |  |  |  |  | √ |  |

As shown in Table 1, an optimal reflecting beam direction of LIS 1 fed back from the target UE is beam 2. Therefore, the determination unit 101 determines the beam 2 of LIS 1 as the reflecting beam direction to be used. Meanwhile, the reflecting beam direction of LIS 1 meeting the communication quality requirement that is fed back from UE 2 and UE 3 also includes the beam 2. Therefore, the determination unit 101 determines UE2, UE3 and UE k as an associated user set of LIS 1, and LIS 1 serves the UEs in the associated user set.

Similarly, as shown in Table 2, the optimal reflecting beam direction of LIS 2 fed back from the target UE is beam 5. Therefore, the determination unit 101 determines beam 5 of LIS 2 as the reflecting beam direction to be used. The reflecting beam direction of LIS 2 meeting the communication quality requirement that is fed back from UE 1 also includes the beam 5. Therefore, the determination unit 101 determines UE1 and UE k as an associated user set of LIS 2, and LIS 2 serves the UEs in the associated user set.

In this way, LIS 1 serves UE2, UE3 and UE k, and LIS 2 serves UE1 and UE k, thus realizing a cooperative transmission mode in which multiple LISs serve multiple UEs.

Next, the LIS-assisted communication transmission is performed between the base station and UE. For example, the base station transmits a directional beam to the determined LIS set, and the communication unit 102 is also configured to provide control information to one or more LISs in the LIS set, to cause each LIS to reflect an incident beam in the determined reflecting beam direction. That is, the base station controls a reflection phase of each LIS through the control information.

In summary, the electronic apparatus 100 according to this embodiment configures a specific LIS reference signal for the base station and UE under the LIS-assisted communication mode, so as to achieve accurate channel measurement under the LIS-assisted communication mode, thus realizing the cooperative transmission mode for multiple LISs and multiple UEs, to avoid or alleviate interferences among UEs. By means of a passive device like LIS, the overhead can be reduced, and energy-saving and green communication can be realized. In addition, the problem of a communication blind spot in a cell is solved with the LIS-assisted communication.

Second Embodiment

Figure 25:
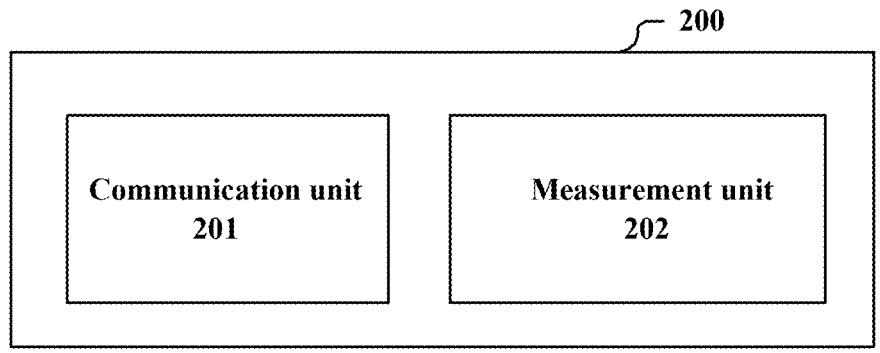
FIG. 25 is a block diagram showing functional modules of an electronic apparatus for wireless communications according to an embodiment of the present disclosure.

FIG. 25 is a block diagram showing functional modules of an electronic apparatus 200 according to another embodiment of the present disclosure. As shown in FIG. 25, the electronic apparatus 200 includes a communication unit 201 and a measurement unit 202. The communication unit 201 is configured to acquire, from a base station, configuration information of an LIS reference signal to be used for channel status measurement under an LIS-assisted communication mode. The measurement unit 202 is configured to perform measurement of the LIS reference signal based on the configuration information.

The communication unit 201 and the measurement unit 202 may be implemented by one or more processing circuits. The processing circuits may be implemented as a chip and a processor, for example. Furthermore, it should be understood that functional units in the electronic apparatus shown in FIG. 25 are only logical modules divided according to the implemented specific functions, and are not intend to limit the specific implementations.

The electronic apparatus 200 may be arranged on a UE side or communicatively connected to the UE, for example. Here, it should also be noted that the electronic apparatus 200 may be implemented in a chip level, or in an apparatus level. For example, the electronic apparatus 200 may function as the UE itself, and may also include an external device such as a memory, a transceiver (not shown). The memory may be used to store programs required by the user equipment to achieve various functions and related data information. The transceiver may include one or more communication interfaces to support communication with different devices (e.g., base station, other user equipment, or the like). Implementations of the transceiver are not limited here.

As described in the first embodiment, the base station may determine that the target UE is to apply the LIS-assisted communication mode, or the target UE may trigger the application of the LIS-assisted communication mode. In the following, a UE that is determined to apply the LIS-assisted communication mode or requests to apply the LIS-assisted communication mode is called the target UE for the purpose of distinguishing.

In a case of being determined to apply the LIS-assisted communication mode, the communication unit 201 may be configured to transmit communication quality information of the target UE, such as CQI, to a base station, so that the base station determines that the target UE is to apply the LIS-assisted communication mode in a case that the communication quality of the target UE drops below a predetermined threshold. In addition, the communication unit 201 may also transmit a priority level of the target UE to the base station, so that the base station may also take the priority level of the target UE into account when determining whether the target UE is to apply the LIS-assisted communication mode. For example, when the priority level of the target UE is high, the base station increases the possibility of applying the LIS-assisted communication mode for the target UE.

In a case of requesting to apply the LIS-assisted communication mode, for example, the communication unit 201 may further be configured to transmit an LIS assisting request to the base station in a case that the communication quality of the target UE is lower than a predetermined threshold, to indicate to the base station that the target UE requests to apply the LIS-assisted communication mode.

The communication quality of the target UE may be measured by various QoS indexes, such as RSRP, RSRQ, SINR.

As described in the first embodiment, the base station determines, in the case of determining the target UE is to apply the LIS-assisted communication mode, an LIS set to be used for LIS-assisted communication for the target UE and an available serving UE set for each LIS in the LIS set. For example, the LIS set includes respective LISs within whose coverage range the target UE is located, and the available serving UE set of an LIS includes UEs within a coverage range of the LIS. In an example, the communication unit 201 is also configured to transmit, to the base station, an identifier of an LIS within whose coverage range the target UE is located, so that the base station may determine the LIS set. Of course, the base station may also determine the LIS set and the available serving UE set described above according to its pre-stored location information of the LIS and location information of each UE. The specific details have been given in the first embodiment, and will not be repeated here.

The communication unit 201 acquires configuration information of LIS reference signals related to LIS in the LIS set from the base station, for example, through RRC signaling. This configuration information is used to know, for example, how the UE receives and parses LIS reference signals, how to report a measurement result, etc.

The measurement unit 202 performs measurement of the LIS reference signal and reports a measurement result according to the configuration information.

For example, the configuration information of the LIS reference signal may include one or more of the following: a time-frequency resource location where the LIS reference signal is located, a correspondence relationship between LIS reference signals on different time-frequency locations and LISs, periodical reporting or non-periodical reporting of a measurement result.

With this configuration information, the UE may know on which time-frequency resources the LIS reference signal is received, which LIS the received LIS reference signal comes from, and further which reflecting beam direction of the LIS the received LIS reference signal comes from, and whether to perform periodical reporting or non-periodical reporting of a measurement result. In other words, the correspondence relationship between LIS reference signals on different time-frequency resource locations and LISs may also include a correspondence relationship between LIS reference signals on different time-frequency resource locations and reflecting beam directions of different LISs in more detail.

For example, in response to the configuration information, the measurement unit 202 may periodically measure the LIS reference signal, and the communication unit 201 periodically reports the measurement result of the LIS reference signal to the base station.

In addition, the communication unit 201 may also acquire trigger signaling for reporting the measurement result of the LIS reference signal from the base station. The measurement unit 202 measures the LIS reference signal aperiodically in response to the trigger signaling, and the communication unit 201 reports an aperiodic measurement result of the LIS reference signal.

For example, LIS reference signals may be configured as follows: LIS reference signals for different LISs are distinguished in frequency domain, and LIS reference signals for different reflecting beam directions of the same LIS are distinguished in time domain. That is, LIS reference signals for different LISs occupy different frequency domain resources, and LIS reference signals for different reflecting beam directions of the same LIS occupy different time domain parts of the frequency domain resources of the LIS.

For example, the reference signals for different LISs are distributed on different subcarriers of OFDM symbols, and the LIS reference signals for different reflecting beam directions of the same LIS are distributed on different resource elements (RE) of the same subcarrier of the OFDM.

In an example, the LIS reference signal is non-precoded/non-beamformed reference signal, and the LIS reference signals for different LISs do not overlap in time domain. In this case, since the LIS reference signal is non-directional and may be reflected by multiple LISs at the same time, the LIS reference signals for different LISs should be assigned with different durations, so that the UE may distinguish the LIS reference signals from different LISs.

In another example, the LIS reference signal is a precoded/beamformed reference signal, and the LIS reference signals for different LISs overlap in the time domain. Because the LIS reference signals are digitally pre-coded, each OFDM symbol may have different subcarriers. The base station may transmit corresponding LIS reference signals directionally according to a position of each LIS. The UE may distinguish LIS reference signals from different LISs according to the subcarriers. In other words, in this case, the LIS reference signals for different LISs may overlap in the time domain, thus having higher configuration flexibility.

In the first embodiment, the configuration mode of LIS reference signals has been described in detail with reference to FIGS. 9 to 23, and will not be repeated here.

The base station transmits the LIS reference signal according to the configuration information of the LIS reference signal, and meanwhile, the base station sequentially controls the reflecting beam direction of each LIS to obtain the desired reflecting beam for downlink beam scanning of the base station-LIS-UE. The UE sequentially measures received signal strength of a corresponding LIS reference signal, and feeds a measurement result back to the base station. The base station selects an appropriate channel for the UE based on the measurement result to perform the LIS-assisted communication.

As an example, in a case that UE is the target UE, the measurement unit 202 is configured to measure the received signal strength of LIS reference signals corresponding to different reflecting beam directions of different LISs, determine, for each LIS, the reflecting beam direction corresponding to the maximum received signal strength; and the communication unit 201 reports the LIS to the base station in association with determined information of reflecting beam direction.

In a case that UE is not the target UE, such as the remaining UE in an available serving UE set, the measurement unit 202 is configured to measure the received signal strength of LIS reference signals corresponding to different reflecting beam directions of different LISs, determine the reflecting beam direction of an LIS meeting the communication quality requirement of the UE, and the communication unit 201 reports the LIS to the base station in association with the determined information of the reflecting beam direction.

It can be understood that if none of reflecting beams of an LIS can meet the communication quality requirement of the UE, the UE may not report for the LIS. If none of reflecting beams of all of the LISs can meet the communication quality requirement of the UE, the UE may continue to maintain direct communication with the base station without reporting a measurement result.

For example, the measurement result reported by the communication unit 201 may include an identifier (ID) of the LIS and an ID of the reflecting beam direction. For example, for the target UE, the measurement result represents an optimal reflecting beam direction of LIS in the LIS set. For the remaining UE, the measurement result represents an LIS and a reflecting beam direction of the LIS that meet the communication quality requirement of the remaining UE.

Alternatively, the measurement result reported by the UE may include a time-frequency resource location of the LIS reference signal. Since the time-frequency resource location of the LIS reference signal corresponds to the reflecting beam direction of the LIS, the base station may determine a corresponding LIS and reflecting beam direction based on the time-frequency resource location.

After the base station acquires the above information, the base station determines a specific LIS-assisted communication mode based on the measurement result, for example, determines one or more LISs to be used in the LIS-assisted communication for the target UE and the reflecting beam direction of each LIS. The base station further determines an associated user set of the target UE based on the measurement result, where the determined one or more LISs also serve the UEs in the associated user set. In this way, multiple LISs-based LIS assisted cooperative transmission among multiple UEs may be realized to avoid interferences among UEs.

Finally, not only the target UE, but also all UEs in the associated user set perform LIS-assisted transmission to avoid interferences among UEs. It should be understood that the above description does not exclude the case where only the target UE is included in the associated user set.

In summary, the electronic apparatus 200 according to this embodiment acquires a specific LIS reference signal configured for a base station and UE under the LIS-assisted communication mode, so as to achieve accurate channel measurement under the LIS-assisted communication mode, thus realizing the cooperative transmission mode for multiple LISs and multiple UEs, to avoid or alleviate interferences among UEs. By using a passive device like LIS, the overhead can be reduced, and energy-saving and green communication can be realized. In addition, the problem of a communication blind spot in a cell is solved with the LIS-assisted communication.

Figure 26:
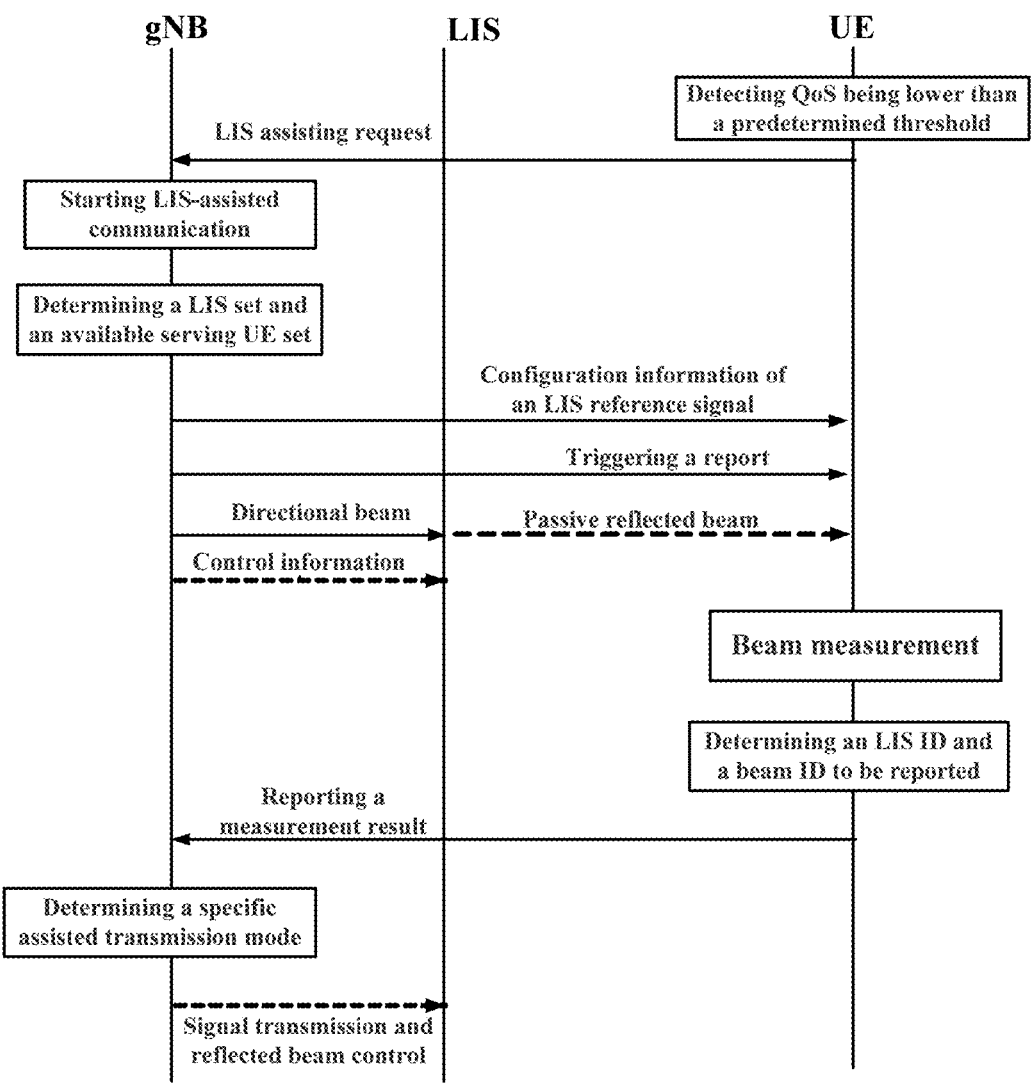
FIG. 26 is a schematic diagram showing an example of information procedure among a base station (gNB), LIS and UE.

For ease of understanding, FIG. 26 is a schematic diagram showing an example of information procedure among a base station (gNB), LIS and UE. Note that the UE here represents a set of a target UE and the remaining UEs. First, the target UE detects that the QoS of the target UE drops below a predetermined threshold, and thus transmits an LIS assisting request to gNB. The gNB determines to start LIS-assisted communication after receiving the LIS assisting request. The gNB determines an LIS set for the target UE and an available serving UE set according to location information of the target UE and the remaining UEs and pre-stored location information of the LISs, and transmits configuration information of the LIS reference signal to the UEs in the available serving UE set. In addition, in the case of non-periodical reporting, the base station also transmits the trigger signaling for reporting a measurement result to the UE. Next, the gNB transmits a directional beam carrying the LIS reference signal to the LIS according to the configuration information and controls a reflecting beam direction of the LIS through control information. After receiving a passive reflecting beam from LIS, the UE performs measurement and determines an LIS ID and beam ID to be reported based on a measurement result. It should be understood that a corresponding time-frequency resource location may also be reported here. As mentioned above, the measurement result reported by the target UE indicates an optimal reflecting beam direction of each LIS for the target UE, and the measurement result reported by the remaining UE indicates a reflecting beam direction of LIS meeting the communication quality requirement of the remaining UE. The base station determines a specific assisted transmission mode based on the obtained measured result, that is, determines which reflecting beam direction of an LIS is used, and an associated user set for which the LISs provide services at the same time. Then, the base station provides the LIS-assisted communication for UEs in the associated user set with this specific assisted transmission mode, which is realized by signal transmission to related LISs and reflecting beam control.

It should be understood that FIG. 26 is only an example and not restrictive.

The Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 27A:
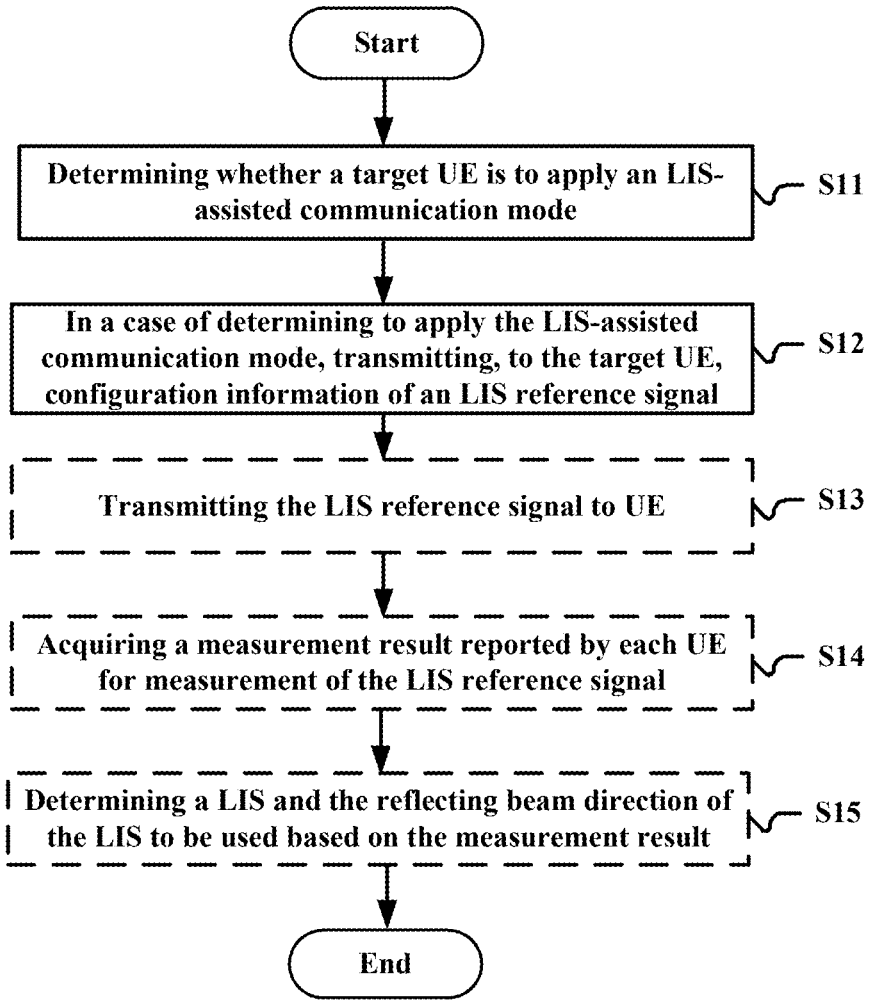
FIG. 27a shows a flowchart of a method for wireless communications according to an embodiment of the present disclosure.

FIG. 27a shows a flowchart of a method for wireless communications according to an embodiment of the present disclosure. The method includes: determining whether a target UE is to apply an LIS-assisted communication mode (S11); and in a case of determining the target UE is to apply the LIS-assisted communication mode, transmitting, to the target UE, configuration information of an LIS reference signal to be used for channel status measurement under the LIS-assisted communication mode (S12). The method may be performed on a base station side, for example.

For example, in a case that a communication quality of the target UE is lower than a predetermined threshold, it is determined that the target UE is to apply the LIS-assisted communication mode. Alternatively, in response to an LIS assisting request from the target UE, it is determined that the target UE is to apply the LIS-assisted communication mode.

The above step S12, may be for example, implemented as follows: in a case of determining the target UE is to apply the LIS-assisted communication mode, an LIS set to be used for LIS-assisted communication for the target UE and an available serving UE set for each LIS in the LIS set are determined, and configuration information of the LIS reference signal related to the LIS in the LIS set is transmitted to each of UE in the available serving UE set, where the LIS set includes respective LISs within whose coverage range the target UE is located, and the available serving UE set of an LIS includes UE within a coverage range of the LIS.

For example, the LIS set and the available serving UE set may be determined based on pre-stored location information of the LIS and location information of each UE.

In addition, one or more of the following may be acquired from the target UE: communication quality of the target UE, an identifier of the LIS within whose coverage range the target UE is located, and a priority level of the target UE.

As shown in the dashed line block in FIG. 27a, the method also includes: transmitting the LIS reference signal to each UE via a corresponding LIS according to the configuration information of the LIS reference signal (S13), and acquiring a measurement result reported by each UE for measurement of the LIS reference signal (S14).

The LIS reference signal may be transmitted periodically and the measurement result of the LIS reference signal may be acquired periodically. Trigger signaling for reporting the measurement result of LIS reference signal may also be transmitted to each UE, and an aperiodic measurement result of the LIS reference signal may be acquired.

The configuration information of the LIS reference signal may include one or more of the following: a time-frequency resource location where the LIS reference signal is located, a correspondence relationship between LIS reference signals on different time-frequency locations and LISs, periodical reporting or non-periodical reporting of a measurement result. For example, LIS reference signals for different LISs may be distinguished in frequency domain, and LIS reference signals for different reflecting beam directions of the same LIS are distinguished in time domain. For example, the LIS reference signals for different LISs are distributed on different subcarriers of OFDM symbols, and the LIS reference signals for different reflecting beam directions of the same LIS are distributed on different resource elements of the same subcarrier of OFDM symbols.

The LIS reference signal may be non-precoded/non-beamformed reference signal, and the LIS reference signals for different LISs do not overlap in time domain. The LIS reference signal may also be precoded/beamformed reference signal and the LIS reference signals for different LISs overlap in the time domain.

In step S14, the following information may be acquired from the target UE: with respect to each LIS in the LIS set, information of a reflecting beam direction in which the target UE receives signal of the maximum strength from the LIS. The following information may be acquired from each UE among at least a part of remaining UEs in the available serving UE set other than the target UE: with respect to each LIS in the LIS set, information of a reflecting beam direction in which the UE receives signal of strength meeting a communication quality requirement.

For example, the reflecting beam direction of each LIS reported by the target UE may be used as the reflecting beam direction of the LIS to be used in LIS-assisted communication, and the UE that receives signal of strength meeting a communication quality requirement in the reflecting beam direction of the LIS may be used as a UE in an associated user set of the target UE, where the LIS also serves the UE in the associated user set.

The measurement result includes, for example, an identifier of the LIS and an identifier of the reflecting beam direction, or a time-frequency resource location of the LIS reference signal.

The method also includes a step S15: determining one or more LISs and the reflecting beam direction of each LIS to be used in LIS-assisted communication of the target UE based on the measurement result, and determining an associated user set of the target UE based on the measurement result, where one or more LISs also serve the UEs in the associated user set.

The method also includes providing control information to one or more LISs so that each LIS reflects an incident beam in the determined reflecting beam direction.

Figure 27B:
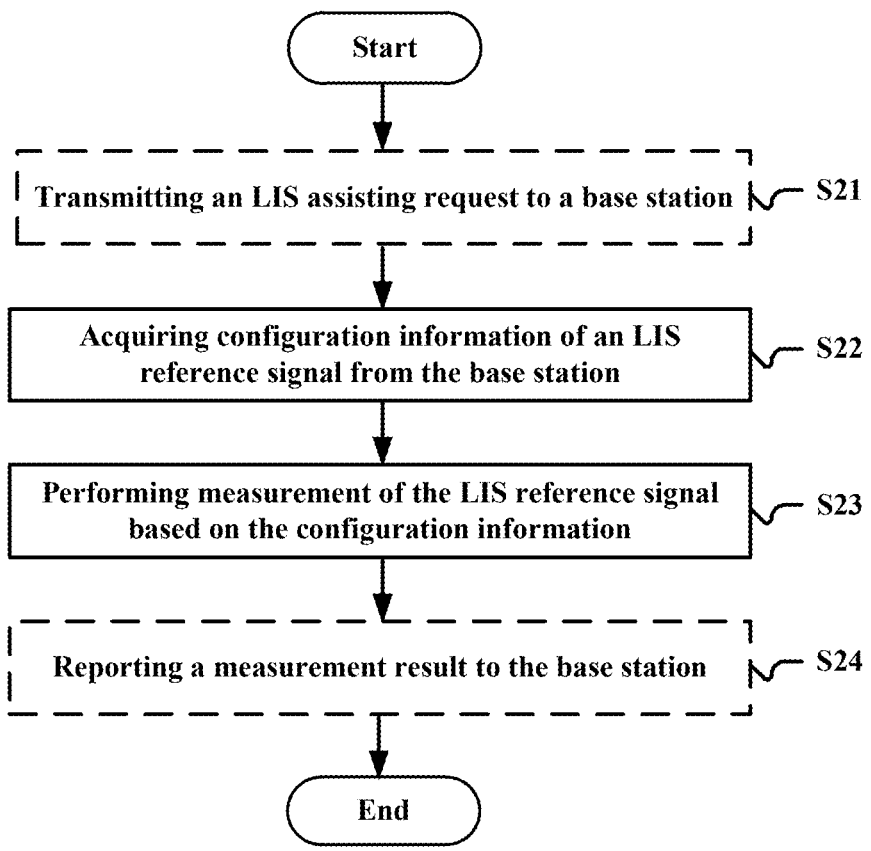
FIG. 27b shows a flowchart of a method for wireless communications according to another embodiment of the present disclosure.

FIG. 27b shows a flowchart of a method for wireless communications according to another embodiment of the present disclosure. The method includes: acquiring, from a base station, configuration information of an LIS reference signal to be used for channel status measurement under an LIS-assisted communication mode (S22); and performing measurement of the LIS reference signal based on the configuration information (S23). The method may be performed on a UE side, for example.

As shown in the dashed line block in FIG. 27b, the method may also include a step S21: in a case that communication quality of the target UE is lower than a predetermined threshold, transmitting an LIS assisting request to the base station to indicate to the base station that the target UE requests to apply the LIS-assisted communication mode.

In addition, one or more of the following may be transmitted to the base station: communication quality of the target UE, an identifier of the LIS within whose coverage range the target UE is located, and a priority level of the target UE.

The configuration information of the LIS reference signal may include one or more of the following: a time-frequency resource location where the LIS reference signal is located, a correspondence relationship between LIS reference signals on different time-frequency locations and LISs, periodical reporting or non-periodical reporting of a measurement result.

The method may also include a step S24: reporting a measurement result to the base station.

In step S23, the LIS reference signal may be measured periodically, and the measurement result of the LIS reference signal may be periodically reported to the base station in S24. Alternatively, trigger signaling for reporting the measurement result of the LIS reference signal may also be acquired from the base station, the LIS reference signal may be measured aperiodically in response to the trigger signaling, and an aperiodic measurement result of the LIS reference signal may be report in S24.

For example, LIS reference signals for different LISs may be distinguished in frequency domain, and LIS reference signals for different reflecting beam directions of the same LIS may be distinguished in time domain. For example, the LIS reference signals for different LISs are distributed on different subcarriers of OFDM symbols, and the LIS reference signals for different reflecting beam directions of the same LIS are distributed on different resource elements of the same subcarrier of OFDM symbols.

The LIS reference signal may be non-precoded/non-beamformed reference signal, and the LIS reference signals for different LISs do not overlap in the time domain. The LIS reference signal may also be precoded/beamformed reference signal and the LIS reference signals for different LISs overlap in the time domain.

For the target UE, received signal strength of the LIS reference signals corresponding to different reflecting beam directions of different LISs is measured in step S23, the reflecting beam direction corresponding to the maximum received signal strength is determined for each LIS, and the LIS is reported to the base station in association with the determined information of reflecting beam direction in step S24.

For the remaining UE, received signal strength of LIS reference signals corresponding to different reflecting beam directions of different LISs is measured in step S23, a reflecting beam direction of an LIS meeting communication quality requirement of the UE is determined, and the LIS is reported to the base station in association with information of the reflecting beam direction in step S24.

The measurement result includes, for example, an identifier of the LIS and an identifier of the reflecting beam direction, or a time-frequency resource location of the LIS reference signal.

Note that the methods described above may be used in combination or separately. The details have been described in detail in the first to second embodiments, and will not be repeated here.

The technology according to the present disclosure may be applied to various products.

For example, the electronic apparatus 100 may be implemented as various base stations. The base stations may be implemented as any type of evolved node B (eNB) or gNB (5G base station). The eNB includes a macro eNB and a small eNB, for example. The small eNB may be an eNB such as a pico eNB, a micro eNB and a home (femto) eNB that covers a cell smaller than a macro cell. The situation is similar to the gNB. Alternatively, the base station may also be implemented as a base station of any other type, such as a NodeB and a base transceiver station (BTS). The base station may include a main body (that is also referred to as a base station device) configured to control wireless communications, and one or more remote radio heads (RRH) arranged in a different place from the main body. In addition, various types of user equipment each may operate as the base station by performing functions of the base station temporarily or semi-permanently.

The electronic apparatus 200 may be implemented as various types of user equipment. The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

APPLICATION EXAMPLES REGARDING A BASE STATION

First Application Example

Figure 28:
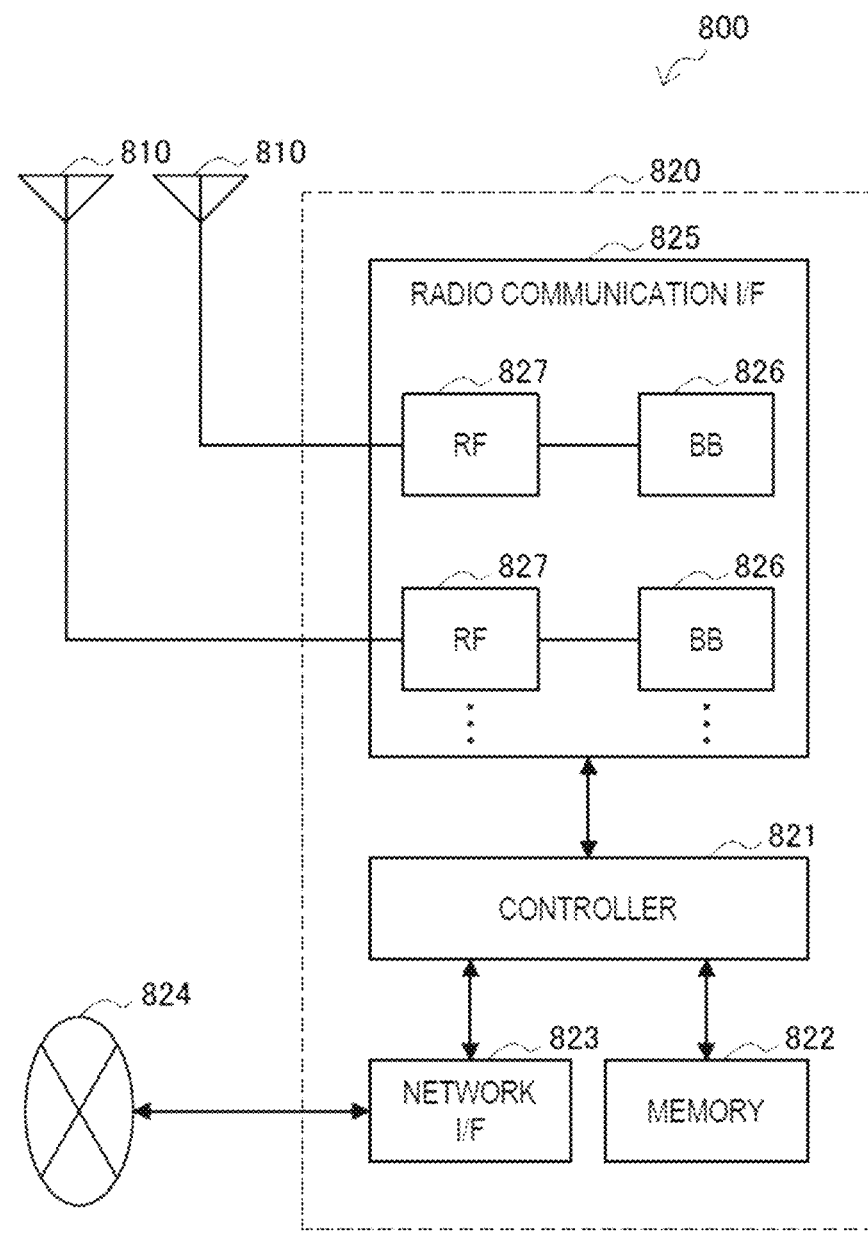
FIG. 28 is a block diagram showing a first example of an exemplary configuration of an eNB or gNB to which the technology of the present disclosure may be applied.

FIG. 28 is a block diagram showing a first example of an exemplary configuration of an eNB or gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antenna elements (such as multiple antenna elements included in a multiple-input multiple-output (MIMO) antenna), and is used for the base station apparatus 820 to transmit and receive wireless signals. As shown in FIG. 28, the eNB 800 may include the multiple antennas 810. For example, the multiple antennas 810 may be compatible with multiple frequency bands used by the eNB 800. Although FIG. 28 shows the example in which the eNB 800 includes the multiple antennas 810, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as a terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. In a case that the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 826 may have a part or all of the above-described logical functions, to replace the controller 821. The BB processor 826 may be a memory storing communication control programs, or a module including a processor and a related circuit configured to execute the programs. Updating the program may allow the functions of the BB processor 826 to be changed. The module may be a card or a blade inserted into a slot of the base station apparatus 820. Alternatively, the module may be a chip mounted on the card or the blade. Meanwhile, the RF circuit 827 may include, for example, a mixer, a filter, and an amplifier, and transmits and receives wireless signals via the antenna 810.

As shown in FIG. 28, the radio communication interface 825 may include multiple BB processors 826. For example, the multiple BB processors 826 may be compatible with multiple frequency bands used by the eNB 800. The radio communication interface 825 may include multiple RF circuits 827, as shown in FIG. 28. For example, the multiple RF circuits 827 may be compatible with multiple antenna elements. Although FIG. 28 shows the example in which the radio communication interface 825 includes multiple BB processors 826 and multiple RF circuits 827, the radio communication interface 825 may include a single BB processor 826 and a single RF circuit 827.

In the eNB 800 as shown in FIG. 28, the communication unit 102 and the transceiver of the electronic apparatus 100 may be implemented by the radio communication interface 825. At least some of the functions may also be implemented by the controller 821. For example, the controller 821 may configure the LIS reference signal for the UE, perform measurement of the LIS reference signal and report a measurement result, and determine a specific LIS-assisted communication mode based on the measurement result to achieve the cooperative LIS-assisted communication among multiple UEs, by performing the functions of the determination unit 101 and the communication unit 102.

Second Application Example

Figure 29:
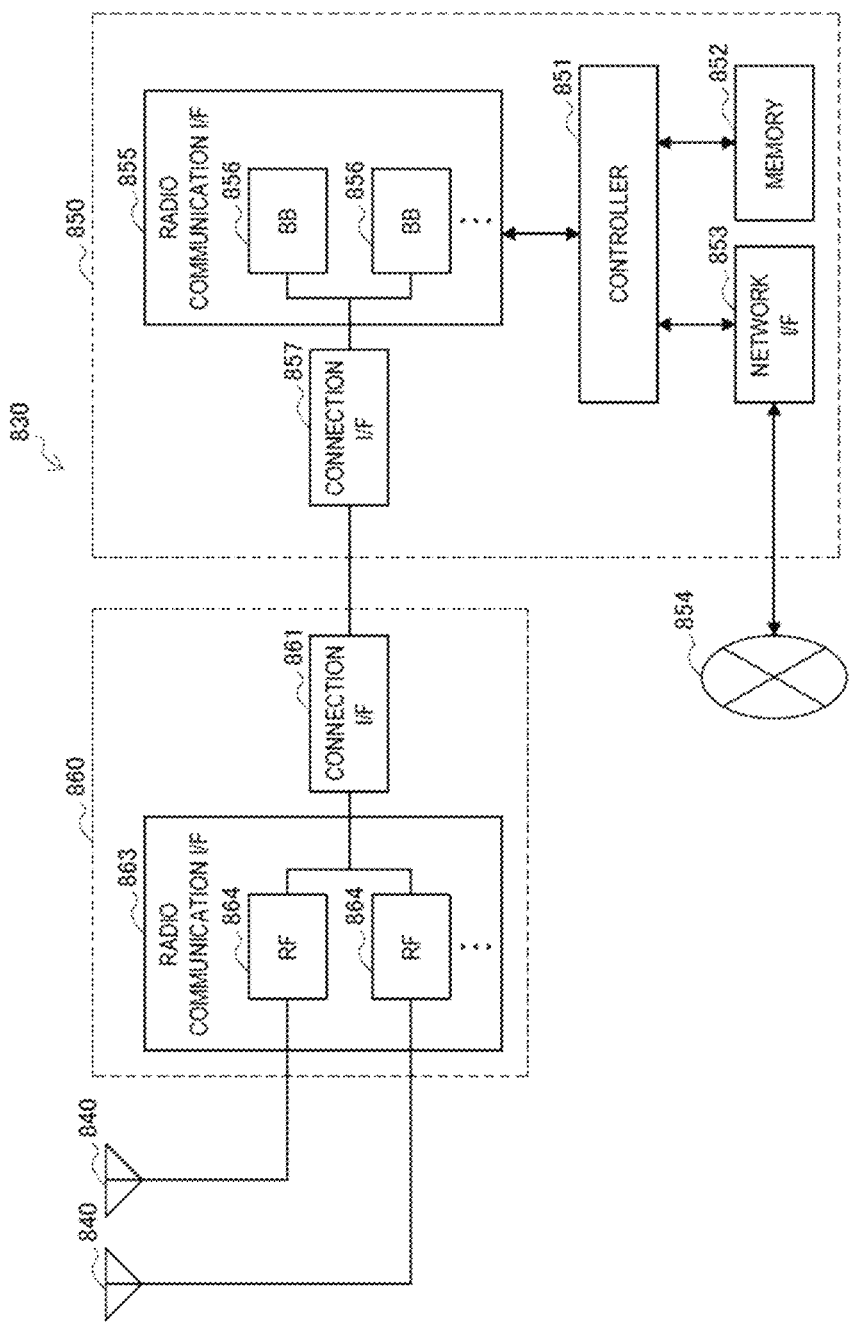
FIG. 29 is a block diagram showing a second example of an exemplary configuration of an eNB or gNB to which the technology of the present disclosure may be applied.

FIG. 29 is a block diagram showing a second example of a schematic configuration of an eNB or gNB to which the technology of the present disclosure can be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 29, the eNB 830 may include multiple antennas 840. For example, the multiple antennas 840 may be compatible with multiple frequency bands used by the eNB 830. Although FIG. 29 shows the example in which the eNB 830 includes multiple antennas 840, the eNB 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 28.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 28, except that the BB processor 856 is connected to an RF circuit 864 of the RRH 860 via the connection interface 857. As show in FIG. 29, the radio communication interface 855 may include multiple BB processors 856. For example, the multiple BB processors 856 may be compatible with multiple frequency bands used by the eNB 830. Although FIG. 29 shows the example in which the radio communication interface 855 includes multiple BB processors 856, the radio communication interface 855 may include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, an RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 29. For example, the multiple RF circuits 864 may support multiple antenna elements. Although FIG. 29 shows the example in which the radio communication interface 863 includes multiple RF circuits 864, the radio communication interface 863 may include a single RF circuit 864.

In the eNB 830 shown in FIG. 29, the communication unit 102 and the transceiver of the electronic apparatus 100 may be implemented by the radio communication interface 855 and/or radio communication interface 863. At least some of the functions may also be implemented by the controller 851. For example, the controller 851 may configure the LIS reference signal for the UE, perform measurement of the LIS reference signal and report a measurement result, and determine a specific LIS-assisted communication mode based on the measurement result, to achieve the cooperative LIS-assisted communication among multiple UEs by performing the functions of the determination unit 101 and the communication unit 102.

APPLICATION EXAMPLE REGARDING USER EQUIPMENT

First Application Example

Figure 30:
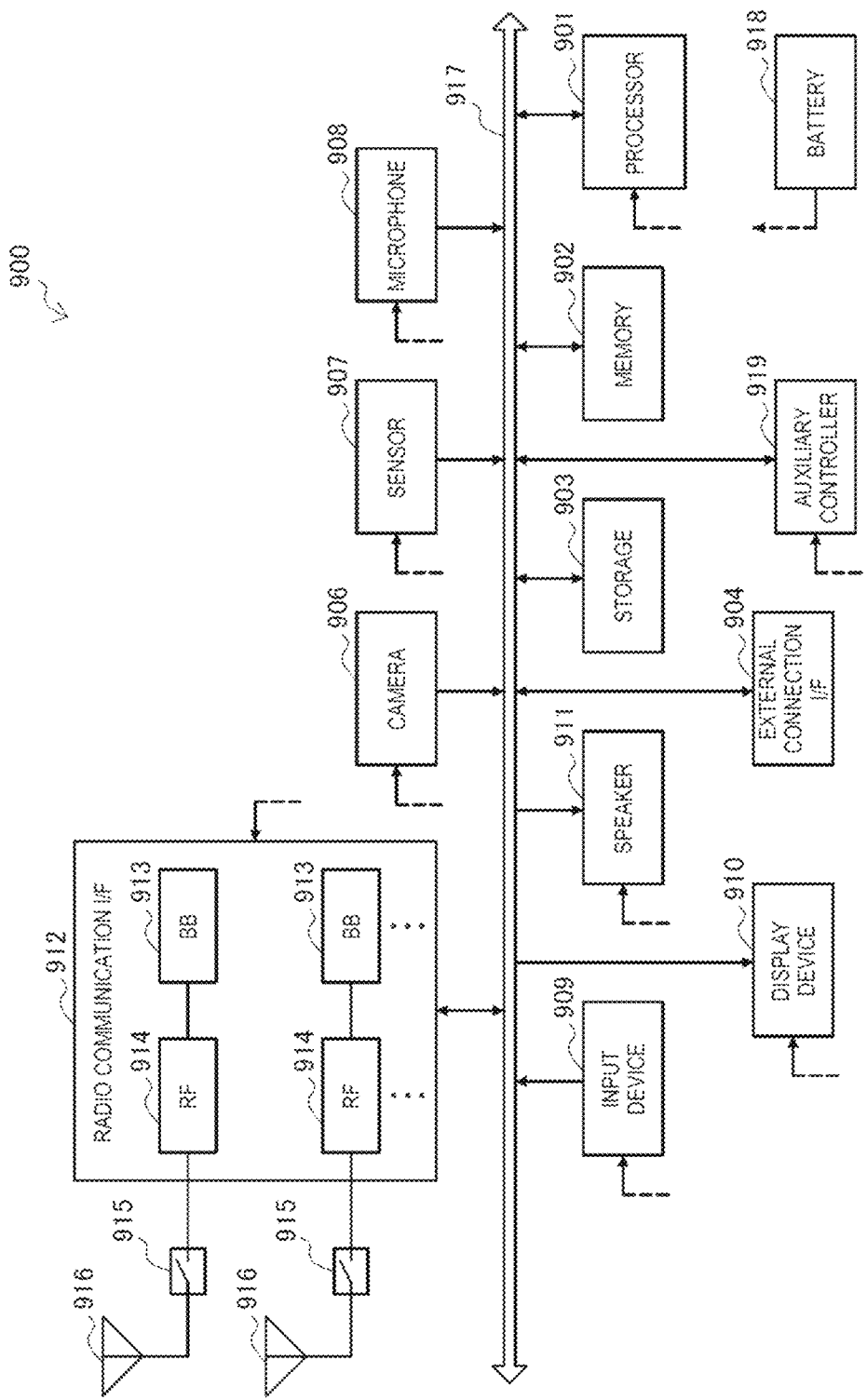
FIG. 30 is a block diagram showing an example of an exemplary configuration of a smartphone to which the technology according to the present disclosure may be applied.

FIG. 30 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals outputted from the smartphone 900 to sounds.

The radio communication interface 912 supports any cellular communication scheme (such as LTE and LTE-advanced), and performs wireless communications. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 30 shows a case that one RF link is connected to one antenna, which is only illustrative, and a situation where one RF link is connected to multiple antennas through multiple phase shifters is also possible. The radio communication interface 912 may be a chip module having the BB processor 913 and the RF circuit 914 integrated thereon. The radio communication interface 912 may include multiple BB processors 913 and multiple RF circuits 914, as shown in FIG. 30. Although FIG. 30 shows the example in which the radio communication interface 912 includes multiple BB processors 913 and multiple RF circuits 914, the radio communication interface 912 may include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in a MIMO antenna) and is used for the radio communication interface 912 to transmit and receive wireless signals. The smartphone 900 may include the multiple antennas 916, as shown in FIG. 30. Although FIG. 30 shows the example in which the smartphone 900 includes multiple antennas 916, the smartphone 900 may include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 shown in FIG. 30 via feeder lines, which are partially shown as dashed lines in FIG. 30. The auxiliary controller 919 operates a minimum necessary function of the smartphone 900, for example, in a sleep mode.

In the smart phone 900 as shown in FIG. 30, the communication unit 102 and the transceiver of the electronic apparatus 200 may be implemented by the radio communication interface 912. At least some of the functions may also be implemented by the processor 901 or auxiliary controller 919. For example, the processor 901 or the auxiliary controller 919 may receive the LIS reference signal, perform the measurement of the LIS reference signal and report a measurement result, and achieve the cooperative LIS-assisted communication among multiple UEs by performing the functions of the communication unit 201 and the measurement unit 202.

Second Application Example

Figure 31:
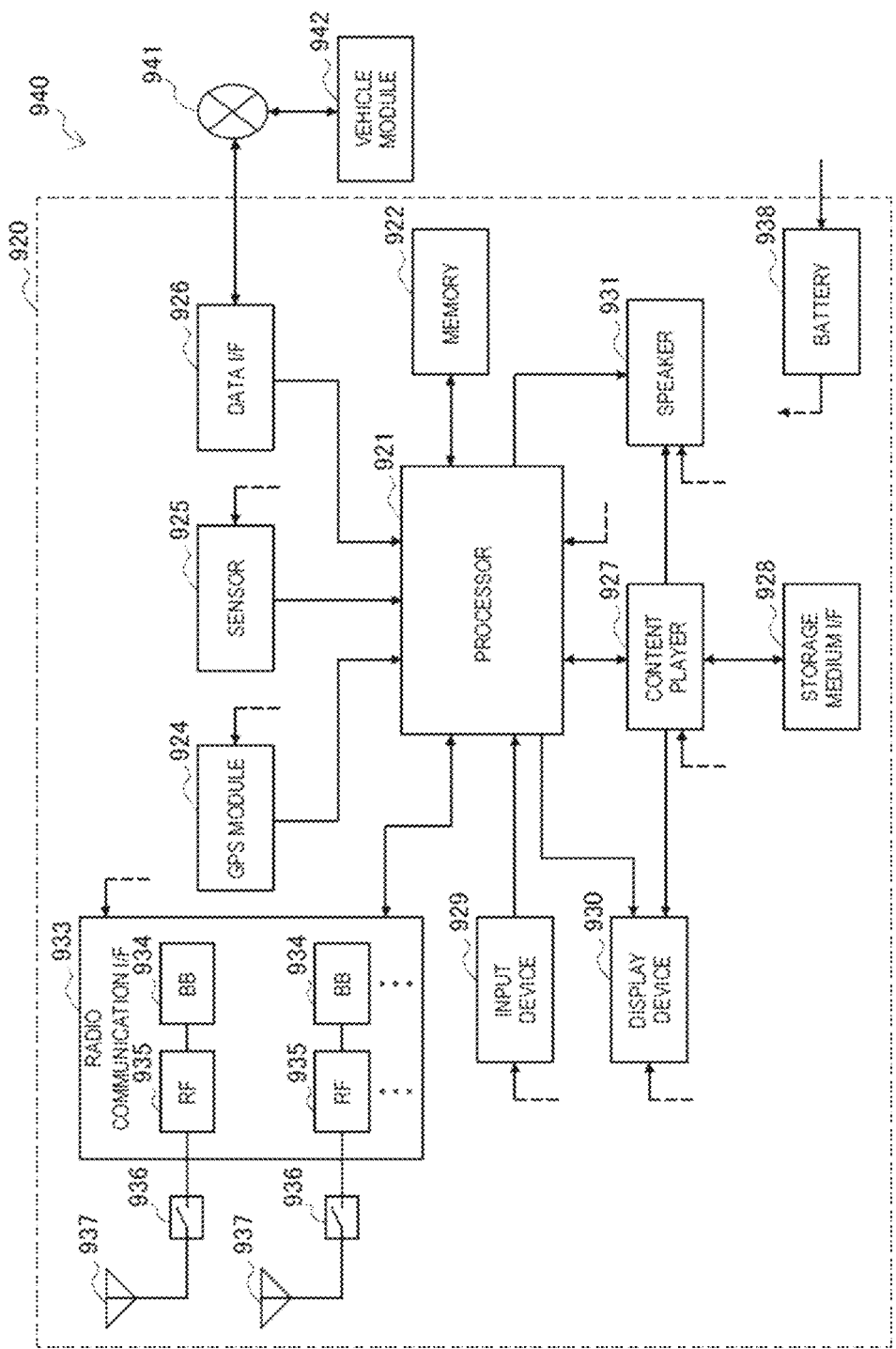
FIG. 31 is a block diagram showing an example of an exemplary configuration of a car navigation apparatus to which the technology according to the present disclosure may be applied.

FIG. 31 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or reproduced content. The speaker 931 outputs a sound for the navigation function or the reproduced content.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 31. Although FIG. 31 shows the example in which the radio communication interface 933 includes multiple BB processors 934 and multiple RF circuits 935, the radio communication interface 933 may include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used for the radio communication interface 933 to transmit and receive wireless signals. As shown in FIG. 31, the car navigation apparatus 920 may include multiple antennas 937. Although FIG. 31 shows the example in which the car navigation apparatus 920 includes multiple antennas 937, the car navigation apparatus 920 may include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 31 via feeder lines that are partially shown as dash lines in FIG. 31. The battery 938 accumulates power supplied from the vehicle.

In the car navigation equipment 920 as shown in FIG. 31, the communication unit 201 and the transceiver of the electronic apparatus 200 may be implemented by the radio communication interface 933. At least some of the functions may also be implemented by the processor 921. For example, the processor 921 may receive the LIS reference signal, perform measurement of the LIS reference signal and report a measurement result, and achieve the cooperative LIS-assisted communication among multiple UEs by performing the functions of the communication unit 201 and the measurement unit 202.

The technology according to the present disclosure may also be implemented as an in-vehicle system (or a vehicle) 940 including one or more blocks of the car navigation device 920, the in-vehicle network 941, and a vehicle module 942. The vehicle module 942 generates vehicle data (such as vehicle speed, engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 3200 shown in FIG. 32) from a storage medium or network, wherein the computer is capable of implementing various functions when installed with various programs.

Figure 32:
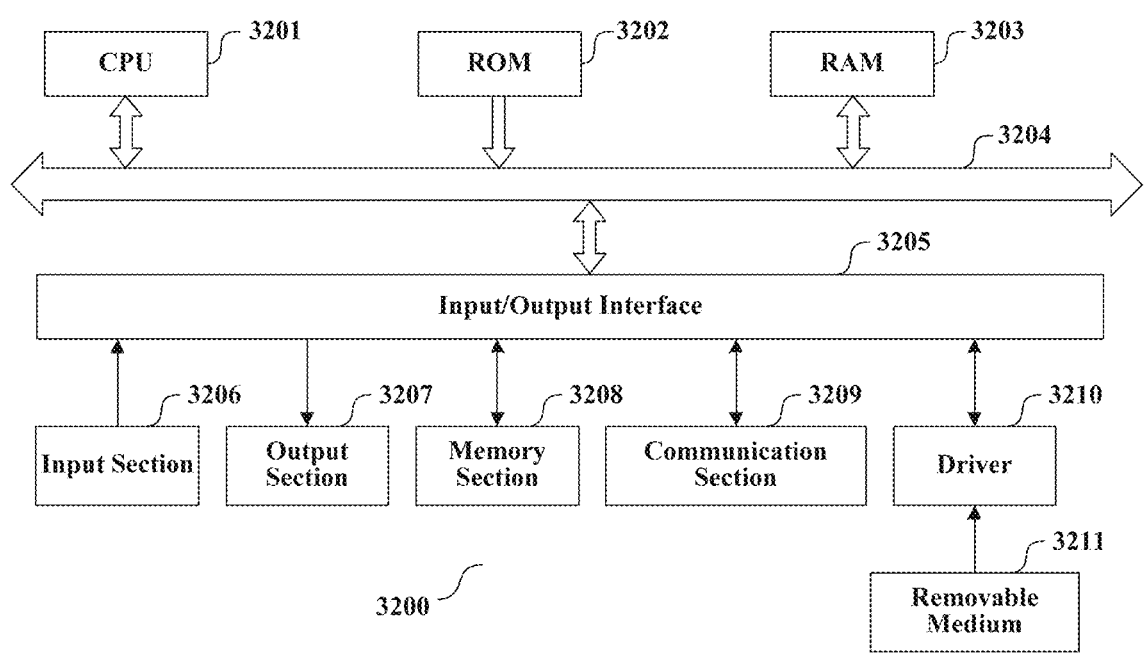
FIG. 32 is a block diagram of an exemplary block diagram illustrating the structure of a general purpose personal computer capable of realizing the method and/or device and/or system according to the embodiments of the present disclosure.

In FIG. 32, a central processing unit (CPU) 3201 executes various processing according to a program stored in a read-only memory (ROM) 3202 or a program loaded to a random access memory (RAM) 3203 from a memory section 3208. The data needed for the various processing of the CPU 3201 may be stored in the RAM 3203 as needed. The CPU 3201, the ROM 3202 and the RAM 3203 are linked with each other via a bus 3204. An input/output interface 3205 is also linked to the bus 3204.

The following components are linked to the input/output interface 3205: an input section 3206 (including keyboard, mouse and the like), an output section 3207 (including displays such as a cathode ray tube (CRT), a liquid crystal display (LCD), a loudspeaker and the like), a memory section 3208 (including hard disc and the like), and a communication section 3209 (including a network interface card such as a LAN card, modem and the like). The communication section 3209 performs communication processing via a network such as the Internet. A driver 3210 may also be linked to the input/output interface 3205, if needed. If needed, a removable medium 3211, for example, a magnetic disc, an optical disc, a magnetic optical disc, a semiconductor memory and the like, may be installed in the driver 3210, so that the computer program read therefrom is installed in the memory section 3208 as appropriate.

In the case where the foregoing series of processing is achieved through software, programs forming the software are installed from a network such as the Internet or a memory medium such as the removable medium 3211.

It should be appreciated by those skilled in the art that the memory medium is not limited to the removable medium 3211 shown in FIG. 32, which has program stored therein and is distributed separately from the apparatus so as to provide the programs to users. The removable medium 3211 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 3202 and the memory section 3208 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a (n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
processing circuitry, configured to:
determine whether a target user equipment is to apply a large intelligent surface (LIS)-assisted communication mode; and
in a case of determining the target user equipment is to apply the LIS-assisted communication mode, transmit, to the target user equipment, configuration information of an LIS reference signal to be used for channel status measurement under the LIS-assisted communication mode,
wherein the processing circuitry is further configured to:
determine, in the case of determining the target user equipment is to apply the LIS-assisted communication mode, an LIS set to be used for LIS-assisted communication for the target user equipment and an available serving user equipment set for each LIS in the LIS set, and
transmit, to each of user equipment in the available serving user equipment set, configuration information of the LIS reference signal related to the LIS in the LIS set,
wherein, the LIS set comprises respective LISs within whose coverage range the target user equipment is located, and the available serving user equipment set of an LIS comprises UEs within a coverage range of the LIS.

2. The electronic apparatus according to claim 1, wherein the processing circuitry is further configured to determine that the target user equipment is to apply the LIS-assisted communication mode in a case that a communication quality of the target user equipment is lower than a predetermined threshold; and/or
wherein the processing circuitry is configured to determine that the target user equipment is to apply the LIS-assisted communication mode in response to an LIS assisting request from the target user equipment.

3. The electronic apparatus according to claim 1, wherein the processing circuitry is further configured to transmit the LIS reference signal to each of user equipment via a corresponding LIS according to the configuration information of the LIS reference signal, and acquire a measurement result reported by each of user equipment for measurement of the LIS reference signal.

4. The electronic apparatus according to claim 3, wherein the processing circuitry is configured to periodically transmit the LIS reference signal and periodically acquire a measurement result of the LIS reference signal; and/or
wherein the processing circuitry is further configured to transmit, to each of user equipment, trigger signaling for reporting the measurement result of the LIS reference signal, and acquire an aperiodic measurement result of the LIS reference signal.

5. The electronic apparatus according to claim 1, wherein the configuration information of the LIS reference signal comprises one or more of the following: a time-frequency resource location where the LIS reference signal is located, a correspondence relationship between LIS reference signals on different time-frequency locations and LISs, periodical reporting or non-periodical reporting of a measurement result.

6. The electronic apparatus according to claim 1, wherein LIS reference signals for different LISs are distinguished in frequency domain, and LIS reference signals for different reflecting beam directions of the same LIS are distinguished in time domain.

7. The electronic apparatus according to claim 6, wherein LIS reference signals for different LISs are distributed on different subcarriers of orthogonal frequency division multiplexing (OFDM) symbols, and LIS reference signals for different reflecting beam directions of the same LIS are distributed on different resource elements of the same subcarrier of OFDM symbols.

8. The electronic apparatus according to claim 6, wherein the LIS reference signal is a non-precoded/non-beamformed reference signal, and the LIS reference signals for different LISs do not overlap in the time domain; and/or
wherein the LIS reference signal is a pre-coded/beamformed reference signal, and the LIS reference signals for different LISs overlap in the time domain.

9. The electronic apparatus according to claim 1, wherein the processing circuitry is further configured to acquire, from the target user equipment, one or more of the following: a communication quality of the target user equipment, an identifier of an LIS within whose coverage range the target user equipment is located, and a priority level of the target user equipment.

10. The electronic apparatus according to claim 1, wherein the processing circuitry is configured to determine the LIS set and the available serving user equipment set based on pre-stored location information of the LIS and location information of each of user equipment.

11. The electronic apparatus according to claim 3, wherein the processing circuitry is configured to acquire, from the target user equipment, with respect to each LIS in the LIS set, information of a reflecting beam direction in which the target user equipment receives signal of the maximum strength from the LIS; and wherein the processing circuitry is configured to acquire, from each of user equipment among at least a part of remaining UE in the available serving UE set other than the target user equipment, with respect to each LIS in the LIS set, information of a reflecting beam direction in which the user equipment receives signal of a strength meeting a communication quality requirement.

12. The electronic apparatus according to claim 3, wherein the measurement result comprises an identifier of an LIS and an identifier of a reflecting beam direction, or comprises a time-frequency resource location of an LIS reference signal.

13. The electronic apparatus according to claim 3, wherein the processing circuitry is configured to determine one or more LISs to be used in LIS-assisted communication for the target user equipment and the reflecting beam direction of each LIS based on the measurement result, and the processing circuitry is further configured to determine an associated user set of the target user equipment based on the measurement result, wherein the one or more LISs also serve user equipment in the associated user set.

14. The electronic apparatus according to claim 13, wherein the processing circuitry is configured to provide control information to the one or more LISs to cause each LIS to reflect an incident beam in a determined reflecting beam direction.

15. The electronic apparatus according to claim 11, wherein the processing circuitry is configured to take a reflecting beam direction of each LIS reported by the target user equipment as a reflecting beam direction of the LIS to be used in LIS-assisted communication, and take a user equipment that receives signal of strength meeting a communication quality requirement in the reflecting beam direction of the LIS as a user equipment in an associated user set of the target user equipment, wherein the LIS also serves user equipment in the associated user set.

16. An electronic apparatus for wireless communications, comprising:
processing circuitry, configured to:
acquire, from a base station, configuration information of an LIS reference signal to be used for channel status measurement under an LIS-assisted communication mode; and perform measurement of the LIS reference signal based on the configuration information, wherein LIS reference signals for different LISs are distinguished in frequency domain, and LIS reference signals for different reflecting beam directions of the same LIS are distinguished in time domain;

wherein LIS reference signals for different LISs are distributed on different subcarriers of orthogonal frequency division multiplexing (OFDM) symbols, and LIS reference signals for different reflecting beam directions of the same LIS are distributed on different resource elements of the same subcarrier of OFDM symbols;

wherein the LIS reference signal is a non-precoded/non-beamformed reference signal, and the LIS reference signals for different LISs do not overlap in the time domain; and wherein the LIS reference signal is a pre-coded/beamformed reference signal, and the LIS reference signals for different LISs overlap in the time domain.

17. The electronic apparatus according to claim 16, wherein the processing circuitry is further configured to transmit an LIS assisting request to the base station in a case that a communication quality of a target user equipment is lower than a predetermined threshold, so as to indicate to the base station that the target user equipment requests to apply the LIS-assisted communication mode.

18. A method for wireless communications, comprising:
determining whether a target user equipment is to apply a large intelligent surface (LIS)-assisted communication mode; and in a case of determining the target user equipment is to apply the LIS-assisted communication mode, transmitting, to the target user equipment, configuration information of an LIS reference signal to be used for channel status measurement under the LIS-assisted communication mode, wherein the method further comprises:
determining, in the case of determining the target user equipment is to apply the LIS-assisted communication mode, an LIS set to be used for LIS-assisted communication for the target user equipment and an available serving user equipment set for each LIS in the LIS set, and transmitting, to each of user equipment in the available serving user equipment set, configuration information of the LIS reference signal related to the LIS in the LIS set, wherein, the LIS set comprises respective LISs within whose coverage range the target user equipment is located, and the available serving user equipment set of an LIS comprises UEs within a coverage range of the LIS.

* * * * *